US012377660B2

(12) United States Patent
Ukishima

(10) Patent No.: US 12,377,660 B2
(45) Date of Patent: Aug. 5, 2025

(54) DENSITY UNEVENNESS CORRECTION DATA CREATION METHOD, DENSITY UNEVENNESS CORRECTION DATA CREATION APPARATUS, PRINTING SYSTEM, PROGRAM, TEST CHART, AND TEST CHART DATA CREATION APPARATUS

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 98 days.

(21) Appl. No.: 18/455,562

(22) Filed: Aug. 24, 2023

(65) Prior Publication Data

US 2024/0066889 A1 Feb. 29, 2024

(30) Foreign Application Priority Data

Aug. 30, 2022 (JP) ................................ 2022-137196

(51) Int. Cl.
*B41J 2/21* (2006.01)
*B41J 2/12* (2006.01)
*B41J 2/205* (2006.01)

(52) U.S. Cl.
CPC ............... *B41J 2/2146* (2013.01); *B41J 2/12* (2013.01); *B41J 2/2056* (2013.01)

(58) Field of Classification Search
CPC ...... B41J 2/2146; B41J 2/2142; B41J 2/2139; B41J 2/12; B41J 2/2056; B41J 2025/008;
(Continued)

(56) References Cited

U.S. PATENT DOCUMENTS

2010/0177367 A1* 7/2010 Komatsu ............ H04N 1/00045 358/518
2012/0113183 A1* 5/2012 Ikeda ..................... B41J 2/2146 347/19

FOREIGN PATENT DOCUMENTS

JP 2006181842 * 7/2006 ................ B41J 2/01
JP 2010036452 2/2010
(Continued)

OTHER PUBLICATIONS

Search Report of European Counterpart Application, issued on Feb. 12, 2024, p. 1-p. 8.

*Primary Examiner* — Kristal Feggins
(74) *Attorney, Agent, or Firm* — JCIPRNET

(57) ABSTRACT

Provided are a density unevenness correction data creation method, a density unevenness correction data creation apparatus, a printing system, a program, a test chart, and a test chart data creation apparatus in which density unevenness correction with high accuracy is implemented. A captured image of a test chart including a density step pattern, an alignment mark, and a line mark is acquired, and in a case of acquiring correspondence relationship information between a theoretical position and an imaging position from the captured image, a rough correspondence relationship is acquired by using positional information of the alignment mark, a detailed correspondence relationship is acquired by using positional information of the line mark estimated by using the rough correspondence relationship, and density unevenness correction data is created by estimating a density value of each position of the density step pattern by using the detailed correspondence relationship.

19 Claims, 20 Drawing Sheets

(58) Field of Classification Search
CPC .......................... B41J 2/04505; B41J 2/04508; B41J 2/14153; B41J 2/04513; B41J 2/04515; B41J 2/04571; B41J 2/2135; B41J 2/512; B41J 11/32; B41J 11/42; B41J 11/425; B41J 13/26; B41J 19/145; B41J 29/44; B41J 15/046; B41J 15/24; B41J 2029/3935; B41J 2/04551
See application file for complete search history.

(56) References Cited

FOREIGN PATENT DOCUMENTS

| | | | | |
|---|---|---|---|---|
| JP | 2012006349 | * | 1/2012 | ............ B41J 2/2142 |
| JP | 6897992 | | 7/2021 | |
| JP | 2022027605 | | 2/2022 | |

* cited by examiner

DENSITY UNEVENNESS CORRECTION DATA CREATION METHOD, DENSITY UNEVENNESS CORRECTION DATA CREATION APPARATUS, PRINTING SYSTEM, PROGRAM, TEST CHART, AND TEST CHART DATA CREATION APPARATUS

CROSS-REFERENCE TO RELATED APPLICATION

The present application claims priority under 35 U.S.C § 119(a) to Japanese Patent Application No. 2022-137196 filed on Aug. 30, 2022, which is hereby expressly incorporated by reference, in its entirety, into the present application.

BACKGROUND OF THE INVENTION

1. Field of the Invention

The present invention relates to a density unevenness correction data creation method, a density unevenness correction data creation apparatus, a printing system, a program, a test chart, and a test chart data creation apparatus.

2. Description of the Related Art

JP6897992B describes a density unevenness correction method in an ink jet printing device. The apparatus described in JP6897992B prints a test pattern including a color density pattern having a pattern corresponding to a plurality of density values, scans the test pattern to acquire a scan image of the test pattern, and creates density unevenness correction data based on the scan image of the test pattern. The density unevenness correction data is applied to printing in a case in which a printed material is created.

In the creation of the density unevenness correction data described in JP6897992B, the scan image of the test pattern is used after image deformation processing is executed in advance on the scan image of the test pattern. As a result, the accuracy of the density unevenness correction is improved.

FIG. 5 in JP6897992B shows a test pattern including a color density pattern and an alignment mark, in which a plurality of alignment marks are disposed on an outer peripheral portion of the color density pattern. Each of the plurality of alignment marks is used in a case in which a position of the test pattern is detected, a print resolution, an inclination of the image, and the like. In addition, the plurality of alignment marks have different shapes from each other, and each of the alignment marks can be identified.

In the image deformation processing applied to the creation of the density unevenness correction data, a center coordinate of an alignment mark portion is detected from the scan image of the test pattern, a deformation parameter representing a relationship between a theoretical coordinate in a plane orthogonal coordinate system and the detected actual coordinate is calculated for a plurality of alignment mark portions, and the color density pattern portion is subjected to two-dimensional deformation processing by using the deformation parameter.

In the apparatus described in JP6897992B, in a case in which a medium applied to printing is wide and the entire region in a width direction of the medium cannot be scanned at one time by executing single scanning, a plurality of scan images having different scan positions in the width direction of the medium are acquired, and the plurality of scan images are combined to obtain the scan image of the entire region in the width direction of the medium. In this case, the scanning is executed such that the alignment mark is shared in a division portion of the medium for each scanning to grasp a composite position between the plurality of scan images. The plurality of scan images are combined based on the shared positional information of the alignment mark portion. It should be noted that the term "alignment mark" represents the alignment mark itself that is printed on the medium and visually recognized. The term "alignment mark portion" represents a signal representing the alignment mark in the scan image. In the present specification, in some cases, the term "image" is used as a meaning of image data representing the image and an electric signal.

JP2010-36452A describes an ink jet type liquid droplet jetting apparatus. FIG. 3 in JP2010-36452A shows a test pattern used for the detection of the density unevenness. The test pattern is composed of three density patterns, a first mark representing a division position of a recording head, a second mark as a reference in a case in which a position of each jetting nozzle is calculated, and an angle detection mark used for detection of an angle error in a case in which the test pattern is printed and read. In the apparatus described in JP2010-36452A, the density unevenness is detected, and a correction value is calculated for each jetting nozzle that is required to be corrected for the density unevenness.

SUMMARY OF THE INVENTION

However, the apparatus described in JP6897992B has the problems described below.

Problem 1

The deformation accuracy of the color density pattern depends on the detection accuracy of the center coordinate of the alignment mark portion. In a case in which the deformation accuracy of the color density pattern is low, a deviation of a correction position of the density unevenness correction is caused, and the correction accuracy of the density unevenness correction can be decreased due to the deviation of the correction position.

For example, in a case in which single-pass printing is executed by using a line head corresponding to a page width, the detection accuracy of the center coordinate of the alignment mark portion in a first direction, which is a nozzle line direction of the line head, is particularly likely to affect the correction accuracy of the density unevenness correction. In addition, there are the problems described below in relation to the detection accuracy of the center coordinate of the alignment mark portion.

Problem 1-A

In a case of a printing device having a relatively high print resolution, such as 1200 dots per inch, a scanner that can apply a scan resolution equal to or higher than the print resolution is expensive, and thus it is difficult to adopt the scanner as a scanning device of the test pattern. In many cases, the scan resolution of the test pattern has to be made relatively low with respect to the print resolution of the test pattern. However, in a case in which a reading resolution of the test pattern is relatively low with respect to the print resolution of the test pattern, the detection accuracy of the center coordinate of the alignment mark portion is likely to be decreased.

Problem 1-B

The plurality of alignment marks have different shapes from each other. Then, the detection accuracy of the center coordinate is changed depending on the shape of each alignment mark portion itself. Therefore, it is difficult to manage the deformation accuracy.

Problem 1-C

In a case in which stains are attached to the printed alignment mark and in a case in which a printing defect, such as a streak, occurs due to a jetting failure of the nozzle, any one a decrease in a detection rate of the alignment mark portion or a decrease in the detection accuracy of the center coordinate of the alignment mark portion, or both of the decreases can occur.

Problem 1-D

It is difficult to improve both the detection rate of the alignment mark portion and the detection accuracy of the center coordinate of the alignment mark portion. For example, in a case in which some additional processing, such as filtering processing, is executed on the scan image of the alignment mark with the intention of improving the detection rate of the alignment mark portion, there is a case in which the detection accuracy of the center coordinate of the alignment mark portion can be decreased.

Problem 2

The processing of deforming the scan image of the alignment mark in a two-dimensional manner can cause inconveniences, such as a relatively heavy calculation load, an increase in consumption of resources applied to calculation processing, and a time required for the calculation processing.

Problem 3

An amount of ink to be dropped varies depending on the pattern portion of each density constituting the color density pattern. In a case in which the medium applied to printing shrinks due to the absorption of the ink, the shrinkage of the medium varies for each pattern of each density.

In the medium, the amount of ink to be dropped is different between a portion in which the alignment mark is printed and a portion in which the color density pattern is printed, and in a case in which the color density pattern portion is subjected to two-dimensional deformation processing by using the deformation parameter calculated based on the scan image of the alignment mark, the accuracy of the deformation processing is decreased, and as a result, the detection accuracy of the center coordinate of the alignment mark portion can be decreased.

An amount of shrinkage of the medium depends on a type of the medium. For example, the amount of shrinkage of a medium having a relatively small thickness is likely to be relatively large as compared with a medium having a relatively large thickness. In addition, the amount of shrinkage of paper is likely to be relatively large as compared with metal.

The amount of shrinkage of the medium also depends on the scan position of the scan image. For example, a case will be considered in which an ink dropping step, a first position scanning step, a drying step, and a second position scanning step are executed in order. In the drying step, the shrinkage of the medium is likely to be promoted, and a shrinkage rate of the medium in the second position scanning step is likely to be larger than the amount of shrinkage of the medium in the first position scanning step. In addition, the apparatus described in JP2010-36452A has the problems described below.

Problem 4

Neither the first mark nor the second mark has a unique shape, and it is difficult to specify an absolute position based on the first mark and the second mark. That is, each of a plurality of mark portions reflected in the scan image of the test pattern has the same shape, and thus it is difficult to specify which mark portion represents which position. It should be noted that the plurality of marks are a collective term for the configuration elements of the first mark and the configuration elements of the second mark.

The present invention has been made in view of such circumstances, and is to provide a density unevenness correction data creation method, a density unevenness correction data creation apparatus, a printing system, a program, a test chart, and a test chart data creation apparatus in which density unevenness correction with high accuracy is implemented by solving at least any one of the problems described above.

A first aspect relates to a density unevenness correction data creation method of creating density unevenness correction data applied to printing of a single-pass method in which a line head in which a plurality of recording elements are disposed along a first direction is used, the density unevenness correction data creation method comprising a test chart captured image acquisition step of acquiring a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, a correspondence relationship information acquisition step of acquiring correspondence relationship information representing a correspondence relationship between a theoretical position in the first test chart and an imaging position in the test chart captured image for the first direction and the second direction, and a density unevenness correction data creation step of creating the density unevenness correction data by using information on a density of the density step pattern in the test chart captured image, in which, in the correspondence relationship information acquisition step, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in the density unevenness correction data creation step, the density unevenness correction data is created by estimating the density value of each position of the density step pattern in the first direction by using the detailed correspondence relationship in the first direction.

With the density unevenness correction data creation method according to the first aspect, the alignment mark is detected from the test chart captured image of the first test chart, and the rough correspondence relationship between the theoretical position and the imaging position is acquired by using a detection result of the alignment mark.

A center position of the line mark is estimated by using the rough correspondence relationship, and the detailed correspondence relationship between the theoretical position and the imaging position is acquired. For the first direction corresponding to a disposition direction of the recording elements of the line head, the density value of each recording element in the first direction is grasped by using the detailed correspondence relationship, and the density unevenness correction data is created based on the density value of each recording element in the first direction.

As a result, the density unevenness correction data on which the density unevenness correction can be executed with high accuracy is created.

The line head has a form of a printing head in which the plurality of recording elements are disposed over a length corresponding to a total length of the print medium in the first direction.

The single-pass method is a printing method in which the print medium and the printing head are relatively moved only once to execute printing on an entire printable region of the print medium.

Examples of the printing method include an ink jet method in which an ink jet head that comprises a plurality of nozzles and that jets ink from the plurality of nozzles is applied.

A second aspect relates to the density unevenness correction data creation method according to the first aspect, in which the density unevenness correction data creation step may include an alignment mark detection step of detecting the plurality of alignment marks from the test chart captured image, and the alignment mark detection step may include a detection improvement processing step of executing, with respect to the test chart captured image, detection improvement processing of improving a probability that the alignment mark is detected.

According to this aspect, a detection probability of the alignment mark can be improved.

A third aspect relates to the density unevenness correction data creation method according to the second aspect, in which, in the correspondence relationship information acquisition step, the detailed correspondence relationship in the first direction may be acquired for the test chart captured image that is not subjected to the detection improvement processing.

According to this aspect, the detection accuracy of the alignment mark can be improved.

A fourth aspect relates to the density unevenness correction data creation method according to the second or third aspect, in which, in the detection improvement processing step, a brightness contrast enhancement amount with respect to the test chart captured image may be decided from brightness information of the alignment mark that is not subjected to the detection improvement processing, and contrast enhancement processing may be executed with respect to the test chart captured image by using the decided brightness contrast enhancement amount.

According to this aspect, appropriate enhancement processing is executed with respect to the alignment mark. As a result, the detection probability of the alignment mark can be improved.

A fifth aspect relates to the density unevenness correction data creation method according to any one of the second to fourth aspects, in which, in the detection improvement processing step, at least any one of blur filter processing, median filter processing, or morphology processing may be applied to the test chart captured image.

According to this aspect, the detection probability of the alignment mark can be improved.

A sixth aspect relates to the density unevenness correction data creation method according to any one of the first to fifth aspects, in which the plurality of line marks may have the same shape.

According to this aspect, a detection probability of the line mark can be improved.

A seventh aspect relates to the density unevenness correction data creation method according to any one of the first to sixth aspects, in which, in the correspondence relationship information acquisition step, the correspondence relationship in the second direction may be acquired based on information on positions of the plurality of alignment marks in the second direction.

According to this aspect, the correspondence relationship in the second direction according to the accuracy of the alignment mark can be acquired.

An eighth aspect relates to the density unevenness correction data creation method according to any one of the first to seventh aspects, in which, in the correspondence relationship information acquisition step, the position of the line mark in the first direction may be estimated by applying image processing with respect to the line mark in the test chart captured image in a case of creating the detailed correspondence relationship in the first direction.

According to this aspect, the estimation accuracy of the line mark can be improved.

A ninth aspect relates to the density unevenness correction data creation method according to the eighth aspect, in which, in the line mark position estimation step, for the estimated positions of the plurality of line marks, the line mark in which a difference of the position of each line mark estimated by using the detailed correspondence relationship with respect to the position of each line mark estimated by using the rough correspondence relationship exceeds a prescribed range may be excluded from the line mark used for acquisition of the detailed correspondence relationship.

According to this aspect, the estimation accuracy of the line mark can be improved.

A tenth aspect relates to the density unevenness correction data creation method according to any one of the first to ninth aspects, in which, in the density unevenness correction data creation step, at least one point of the theoretical position of each recording element may be obtained from the test chart captured image for each density pattern included in the density step pattern by using the correspondence relationship, the test chart captured image may be subjected to averaging processing or integration processing within a range of the density pattern for the second direction with respect to the theoretical position of each recording element obtained from the test chart captured image, and a density of each density pattern of each recording element may be estimated.

According to this aspect, the estimation accuracy of the density of each recording element can be improved.

An eleventh aspect relates to the density unevenness correction data creation method according to any one of the first to tenth aspects, in which the density unevenness correction data creation method may further comprise a mode switching step of selectively switching between a first mode in which the density unevenness correction data is created based on the test chart captured image of the first test chart, and a second mode which is executed separately from the first mode and in which the density unevenness correction data is created based on a second test chart in which a line pattern extending in the second direction is superimposed on the density step pattern included in the first test chart, and, in the second mode, a position of the line pattern in the first direction is estimated for a test chart captured image of the second test chart, the detailed correspondence relationship in the first direction is acquired by using information on the estimated position of the line pattern in the first direction, and the density unevenness correction data is created by estimating the density value of each position of the density step pattern in the first direction by using the detailed correspondence relationship in the first direction.

According to this aspect, density unevenness correction data with high accuracy data according to expansion and shrinkage characteristics of the print medium is generated. As a result, the density unevenness correction in which an influence of the expansion and shrinkage characteristics of the print medium is suppressed is executed.

A twelfth aspect relates to the density unevenness correction data creation method according to the eleventh aspect, in which, in the second mode, common information common to a first sequence for generating the density unevenness correction data applied to the first mode and a second sequence for generating the density unevenness correction data applied to the second mode may be used to correct a deviation of the correspondence relationship between the first sequence and the second sequence.

According to this aspect, the deviation between the density unevenness correction data generated in the first mode and the density unevenness correction data generated in the second mode can be avoided.

A thirteenth aspect relates to the density unevenness correction data creation method according to the twelfth aspect, in which the common information may include information on an edge of the density pattern in the first direction.

According to this aspect, the deviation of the correspondence relationship between the first sequence and the second sequence is corrected with high accuracy.

A fourteenth aspect relates to the density unevenness correction data creation method according to the twelfth aspect, in which the common information may include the information on the positions of the plurality of line marks in the first direction.

According to this aspect, the deviation of the correspondence relationship between the first sequence and the second sequence is corrected with high accuracy.

A fifteenth aspect relates to the density unevenness correction data creation method according to any one of the twelfth to fourteenth aspects, in which the density unevenness correction data creation method may further comprise an overlap region correction step of, in a case in which the test chart captured image is generated by using a plurality of image sensors, correcting the deviation of the correspondence relationship between the first sequence and the second sequence by using information on the line mark included in an overlap region in which imaging regions of the image sensors overlap for the first direction.

According to this aspect, the deviation of the correspondence relationship between the first sequence and the second sequence due to the overlap region is corrected with high accuracy.

A sixteenth aspect relates to the density unevenness correction data creation method according to the fifteenth aspect, in which, in the overlap region correction step, the deviation of the correspondence relationship between the first sequence and the second sequence may be corrected by using information in which positions of a plurality of the line marks disposed in the overlap region are subjected to statistical processing.

According to this aspect, the deviation of the correspondence relationship between the first sequence and the second sequence due to the overlap region is corrected with high accuracy.

A seventeenth aspect relates to a density unevenness correction data creation apparatus that creates density unevenness correction data applied to printing of a single-pass method in which a line head in which a plurality of recording elements are disposed along a first direction is used, the density unevenness correction data creation apparatus comprising one or more processors, and one or more memories that store a program executed by the one or more processors, in which the one or more processors execute a command of the program to acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, acquire correspondence relationship information representing a correspondence relationship between a theoretical position in the first test chart and an imaging position in the test chart captured image for the first direction and the second direction, and create the density unevenness correction data by using information on a density of the density step pattern in the test chart captured image, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating the density unevenness correction data, the density unevenness correction data is created by estimating the density value of each position of the density step pattern in the first direction by using the detailed correspondence relationship in the first direction.

With the density unevenness correction data creation apparatus according to the seventeenth aspect, the same actions and effects as the density unevenness correction data creation method according to the first aspect can be obtained. The configuration requirements of the density unevenness correction data creation method according to the second to sixteenth aspects can be applied to the configuration requirements of the density unevenness correction data creation apparatus according to the other aspects.

An eighteenth aspect relates to a printing system comprising a line head in which a plurality of recording elements are disposed along a first direction, and a density unevenness correction data creation apparatus that creates density unevenness correction data applied to printing of a single-pass method in which the line head is used, in which the density unevenness correction data creation apparatus includes one or more processors, and one or more memories that store a program executed by the one or more processors, the one or more processors execute a command of the program to acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, acquire correspondence relationship information representing a correspondence relationship between a theoretical position in the first test chart and an imaging position in the test chart captured image for the first direction and the second direction, and create the density unevenness correction data by using information on a density of the density step pattern in the test chart captured image, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating the density unevenness correction data, the density unevenness correction data is created by estimating the density value of each position of the density step pattern in the first direction by using the detailed correspondence relationship in the first direction.

With the printing system according to the eighteenth aspect, the same actions and effects as the density unevenness correction data creation method according to the first aspect can be obtained. The configuration requirements of the density unevenness correction data creation method according to the second to sixteenth aspects can be applied to the configuration requirements of the printing system according to the other aspects.

A nineteenth aspect relates to a program of creating density unevenness correction data applied to printing of a single-pass method in which a line head in which a plurality of recording elements are disposed along a first direction is used, the program causing a computer to acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, acquire correspondence relationship information representing a correspondence relationship between a theoretical position in the first test chart and an imaging position in the test chart captured image for the first direction and the second direction, and create the density unevenness correction data by using information on a density of the density step pattern in the test chart captured image, in which, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating density unevenness correction data, the density unevenness correction data is created by estimating the density value of each position of the density step pattern in the first direction by using the detailed correspondence relationship in the first direction.

With the program according to the nineteenth aspect, the same actions and effects as the density unevenness correction data creation method according to the first aspect can be obtained. The configuration requirements of the density unevenness correction data creation method according to the second to sixteenth aspects can be applied to the configuration requirements of the program according to the other aspects.

A twentieth aspect relates to a test chart that is used in a case of creating density unevenness correction data applied to printing of a single-pass method in which a line head in which a plurality of recording elements are disposed along a first direction is used, the test chart comprising a density step pattern including one or more density patterns corresponding to one or more density values, a plurality of alignment marks having different shapes from each other, and a plurality of line marks having shapes extending in a second direction orthogonal to the first direction.

With the test chart according to the twentieth aspect, as the density unevenness correction data used for the density unevenness correction executed in the single-pass printing in which the line head is used, the density unevenness correction data in which the density unevenness correction with high accuracy is implemented can be created.

The configuration requirements of the density unevenness correction data creation method according to the second to sixteenth aspects can be applied to the configuration requirements of the test chart according to the other aspects.

A twenty-first aspect relates to the test chart according to the twentieth aspect, in which the plurality of line marks may have the same shape.

A twenty-second aspect relates to the test chart according to the twentieth or twenty-first aspect, in which the test chart may further comprise an abnormal recording element detection pattern used in a case of executing detection of an abnormality in the recording element.

A twenty-third aspect relates to the test chart according to the twenty-second aspect, in which the abnormal recording element detection pattern may include a plurality of lines that are recorded by using each of the plurality of recording elements, that have different positions in the first direction for each recording element, and that extend in the second direction.

A twenty-fourth aspect relates to a test chart data creation apparatus that creates test chart data representing a test chart used for creation of density unevenness correction data applied to printing of a single-pass method in which a line head in which a plurality of recording elements are disposed along a first direction is used, in which the test chart is a test chart including a density step pattern including one or more density patterns corresponding to one or more density values, a plurality of alignment marks having different shapes from each other, and a plurality of line marks having shapes extending in a second direction orthogonal to the first direction, and the test chart data creation apparatus comprises a graphical user interface used in a case of adjusting at least any one of an alignment mark parameter applied to the alignment mark or a line mark parameter applied to the line mark.

A twenty-fifth aspect relates to the test chart data creation apparatus according to the twenty-fourth aspect, in which the graphical user interface may be used in a case of adjusting at least any one of a size of the alignment mark, an aspect ratio of the alignment mark, a density of the alignment mark, the number of the alignment marks, or an interval between the alignment marks adjacent to each other.

A twenty-sixth aspect relates to the test chart data creation apparatus according to the twenty-fourth or twenty-fifth aspect, in which the graphical user interface may be used in a case of adjusting at least any one of a size of the line mark, an aspect ratio of the line mark, a density of the line mark, the number of the line marks, or an interval between the line marks adjacent to each other.

A twenty-seventh aspect relates to the test chart data creation apparatus according to any one of the twenty-fourth to twenty-sixth aspects, in which the line mark may include a low density portion having a relatively low density value and a high density portion having a higher density value than the low density portion, and the graphical user interface may be used in a case of adjusting at least any one of a density of the low density portion, a length of the low density portion in the first direction, a density of the high density portion, or a length of the high density portion in the first direction.

According to the aspects of the present invention, the alignment mark is detected from the test chart captured image of the first test chart, and the rough correspondence relationship between the theoretical position and the imaging position is acquired by using the detection result of the alignment mark. The center position of the line mark is estimated by using the rough correspondence relationship, and the detailed correspondence relationship between the theoretical position and the imaging position is acquired. For the first direction corresponding to the disposition direction of the recording elements of the line head, the density value of each recording element in the first direction is grasped by using the detailed correspondence relationship, and the density unevenness correction data is created based on the density value of each recording element in the first direction. As a result, the density unevenness correction data on which the density unevenness correction can be executed with high accuracy is created.

DESCRIPTION OF THE PREFERRED EMBODIMENTS

Figure 1:
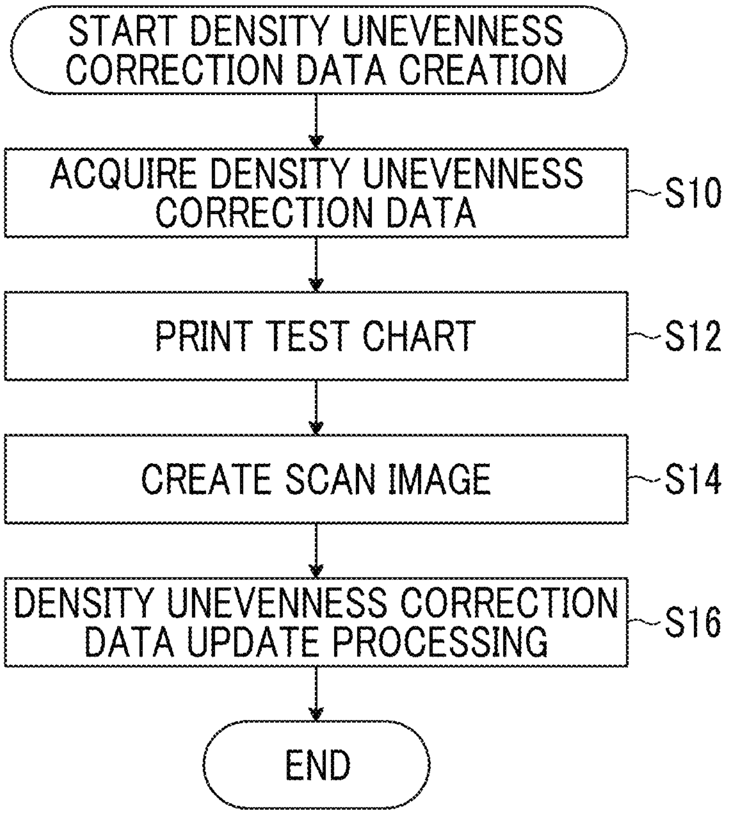
FIG. 1 is a flowchart showing a procedure of a density unevenness correction data creation method according to a first embodiment.

Hereinafter, preferred embodiments of the present invention will be described in detail with reference to the accompanying drawings. In the present specification, the same reference numeral will be given to the same configuration element and overlapping description thereof is omitted as appropriate.

First Embodiment

Outline of Density Unevenness Correction Data Creation Method

FIG. 1 is a flowchart showing a procedure of a density unevenness correction data creation method according to the first embodiment. Hereinafter, an example of the density unevenness correction data creation method in which each step is executed by using a density unevenness correction data creation apparatus provided in a printing system will be described. A computer comprising a processor is applied to the density unevenness correction data creation apparatus. An example in which an ink jet printing device is applied as the printing system will be described.

The density unevenness correction to which density unevenness correction data is applied is processing of suppressing density unevenness of a print image due to a variation in jetting performance of a plurality of nozzles provided in the ink jet head, and is executed by using the density unevenness correction data that is created in advance and stored. It should be noted that the plurality of nozzles described in the embodiment is an example of a plurality of recording elements.

The density unevenness correction data creation method shown in FIG. 1 is composed of a density unevenness correction data acquisition step S10, a test chart printing step S12, a scan image creation step S14, and a density unevenness correction data update processing step S16.

Density Unevenness Correction Data Acquisition Step

In the density unevenness correction data acquisition step S10, the density unevenness correction data in the present state stored in advance is acquired. The density unevenness correction can be repeatedly executed as feedback. In a case in which the first density unevenness correction is executed, the density unevenness correction data in the present state is initial data in an uncorrected state. For the acquisition of the initial data, reading of an initial data file prepared in advance may be applied, or the initial data may be created inside the software. In a case in which the density unevenness correction data is acquired in the density unevenness correction data acquisition step S10, the processing proceeds to the test chart printing step S12.

Test Chart Printing Step

In the test chart printing step S12, print data information of the test chart in a state in which density unevenness correction processing is executed is created by applying the current density unevenness correction data acquired in the density unevenness correction data acquisition step S10.

In the test chart printing step S12, the ink is jetted from the ink jet head to a print medium by using the created print data of the test chart to print the test chart on a print surface of the print medium. In a case in which the first density unevenness correction is executed, the density unevenness correction processing may be omitted. In a case in which the density unevenness correction processing is omitted, the density unevenness correction data acquisition step S10, which is the previous step, may be omitted.

The test chart printed in the test chart printing step S12 includes a density step pattern comprising a plurality of patterns corresponding to each of the plurality of density values. It should be noted that the details of the test chart will be described below. In a case in which the test chart is printed in the test chart printing step S12, the processing proceeds to the scan image creation step S14.

Scan Image Creation Step

In the scan image creation step S14, the printed test chart is imaged by using an image sensor system provided with an image sensor, and a scan image of the test chart is created. Moreover, examples of the image sensor system include a scanner device.

It is preferable to execute shading correction due to the performance of the image sensor system in a case in which the test chart is imaged. Examples of the performance of the image sensor system include unevenness of an amount of illumination light due to a distribution of the amounts of illumination light, unevenness of reading due to a distribution of reading characteristics of the image sensor, and the like.

A shading characteristic of the image sensor system can be acquired by reading a white reference plate, a non-print portion of the medium, and the like by using the image sensor in advance. A portion of the non-print portion referred to here can include the concept of a region.

For example, the non-print portion may be provided on at least any one of an upper side of the test chart, a lower side of the test chart, or an inside of the test chart on the print medium, and the shading characteristic may be acquired by using the non-print portion reflected in the scan image of the test chart read at a timing at which the density unevenness correction is executed. In a case in which the shading characteristic is acquired in this way, an appropriate shading characteristic can be acquired in a case in which the density unevenness correction is executed even in a case in which the shading characteristic is changed with time. In a case in which the scan image of the test chart is created in the scan image creation step S14, the processing proceeds to the density unevenness correction data update processing step S16. It should be noted that the scan image creation step described in the embodiment is an example of a test chart captured image acquisition step.

Density Unevenness Correction Data Update Processing Step

The density unevenness correction data update processing step S16 includes an analysis step of analyzing the scan image of the test chart, a creation step of creating the latest density unevenness correction data by using an analysis result of the scan image, and a storage step of storing the latest density unevenness correction data. The printing system executes the density unevenness correction processing with respect to the print data of the print image by using the latest density unevenness correction data, and executes the printing.

Specific Example of Test Chart

Outline of Configuration

Figure 2:
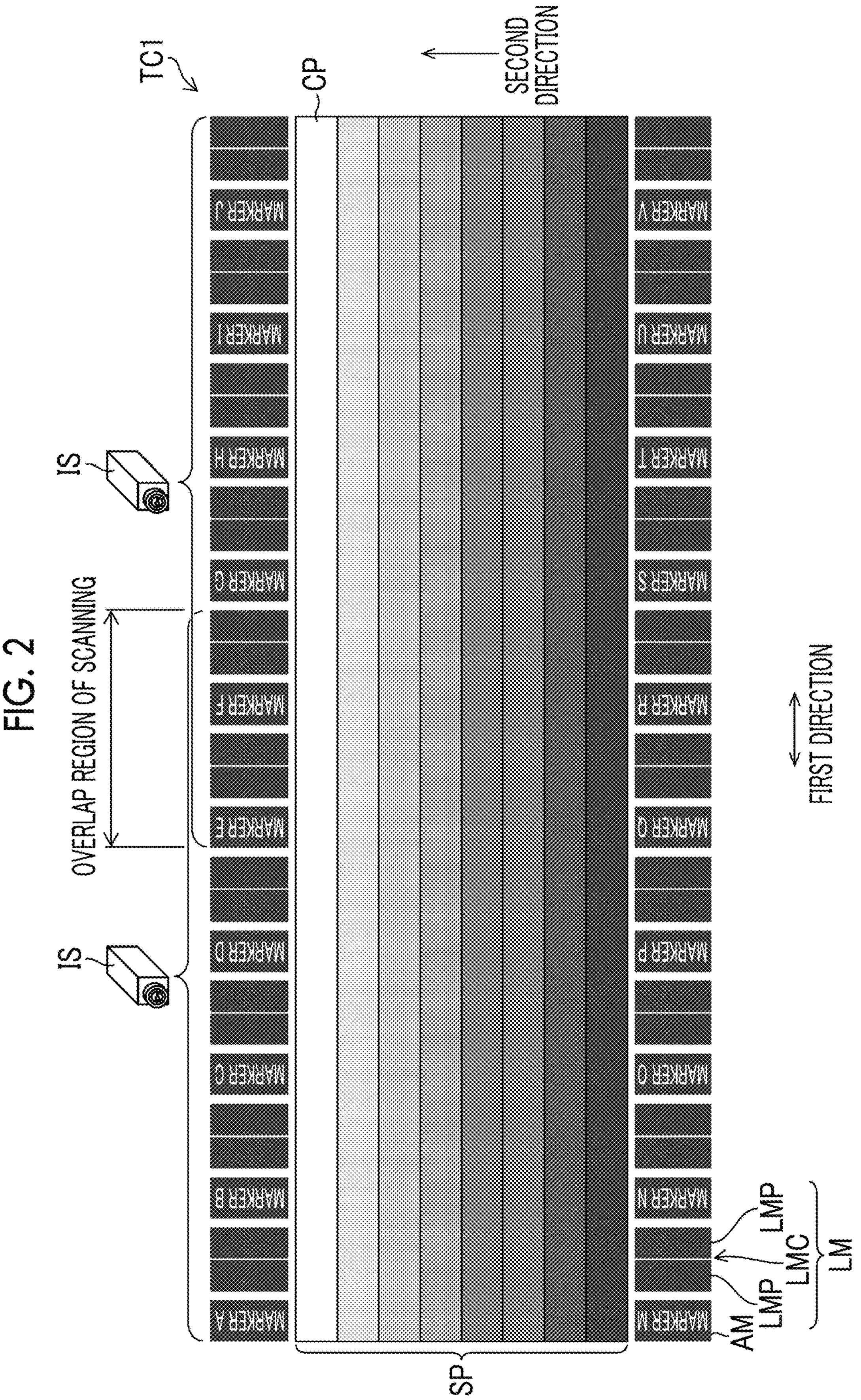
FIG. 2 is a schematic diagram of a test chart.

FIG. 2 is a schematic diagram of the test chart. FIG. 2 schematically shows a test chart TC1 printed on the print medium. A first direction shown in FIG. 2 is a direction corresponding to a direction in which the plurality of nozzles provided in the ink jet head are disposed. A second direction is a direction orthogonal to the first direction. The first direction and the second direction are directions prescribed on the print surface of the print medium, and are directions parallel to the print surface of the print medium.

In a case in which the nozzles provided in the ink jet head are disposed in a two-dimensional manner, the direction in which the nozzles are disposed is the direction in which the nozzles are substantially disposed. In a case of the line head, a direction parallel to a width direction of the print medium, which is orthogonal to a transport direction of the print medium, is a direction in which the nozzles are substantially disposed.

In the test chart TC1 shown in FIG. 2, a plurality of alignment marks AM and a plurality of line marks LM are disposed on an outer periphery of a density step pattern SP, and the alignment marks AM and the line marks LM are alternately disposed in the first direction.

FIG. 2 shows, as an example, one outer side and the other outer side of the density step pattern SP in the second direction, as the outer periphery of the density step pattern SP. Although FIG. 2 shows, as an example, the test chart TC1 in which the number of the alignment marks AM and the number of the line marks LM are the same, the number of the alignment marks AM and the number of the line marks LM may be different from each other.

Content of Alignment Mark

The alignment mark AM is used in a case in which a rough position on the print medium is estimated. Each of the plurality of alignment marks AM has a unique shape, and it is possible to identify which alignment mark AM is.

Figure 3:
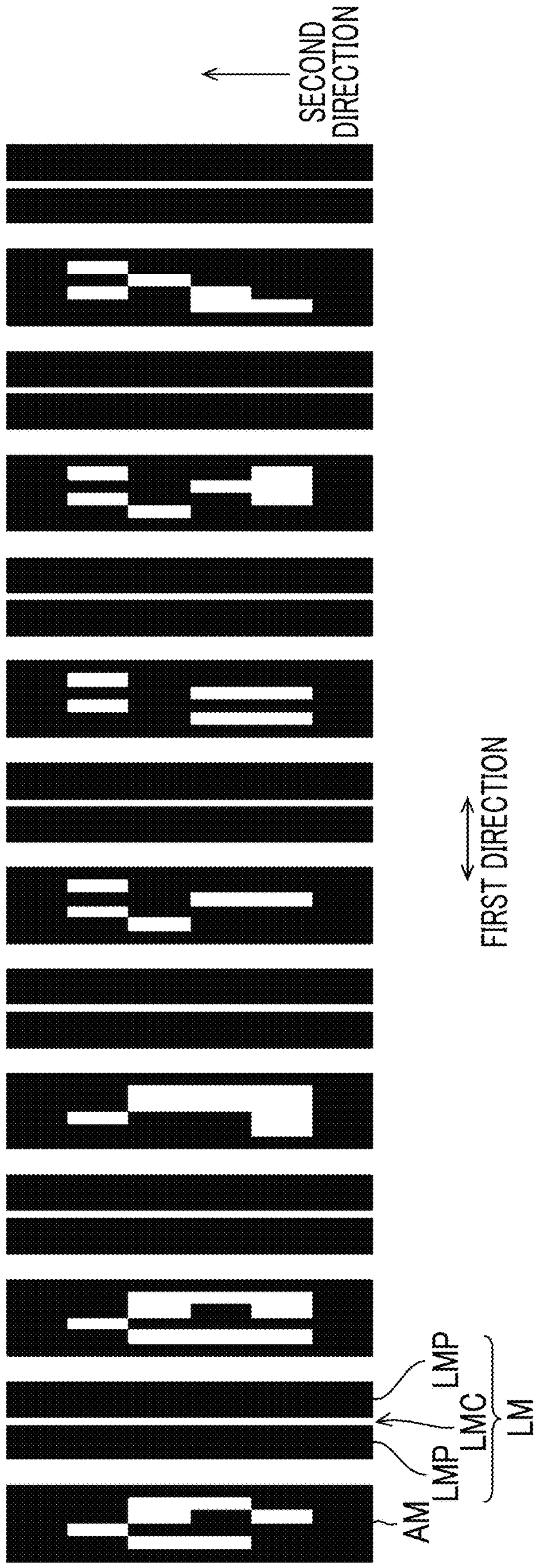
FIG. 3 is a diagram showing specific examples of an alignment mark and a line mark shown in FIG. 2.

FIG. 2 schematically shows a difference in a shape of each of the plurality of alignment marks AM by using character strings having different alphabets attached to the characters called markers. An example of a specific shape of the alignment mark AM is shown in FIG. 3.

Content of Line Mark

The line mark LM is used for the estimation of a detailed print position in the first direction. A line direction in which the line mark LM extends is the second direction orthogonal to the first direction. The line mark LM is preferably a simple solid line, but need only be generally the line mark LM that can be recognized as a line. For example, a dotted line, a broken line, and the like can also be included in the concept of the line.

Each of the plurality of line marks LM has a center line portion LMC to which a relatively low density value is applied to a center position in the first direction, and a peripheral line portion LMP to which a relatively high density value is applied to both sides of the center line portion LMC in the first direction. As shown in FIG. 2, a minimum density value is applied to the center line portion LMC, and a maximum density value is applied to the peripheral line portion LMP. For the densities of the center line portion LMC and the peripheral line portion LMP, it is sufficient that there is a contrast between the center line portion LMC and the peripheral line portion LMP, and a density value exceeding the minimum density value may be applied to the center line portion LMC, or a density value lower than the maximum density value may be applied to the peripheral line portion LMP.

The center line portion LMC in each line mark LM is formed at the center position of each line mark LM in the first direction. The center position in the first direction of the center line portion LMC having a prescribed length in the first direction is prescribed as the center position of the center line portion LMC in each line mark LM. A position of the center line portion LMC in each line mark LM need only be any position as long as the center line portion LMC can be recognized, and the center line portion LMC does not have to be the center position of each line mark LM in the first direction.

A relationship between the density value of the center line portion LMC and the density value of the peripheral line portion LMP in the line mark LM may be a relationship that the density value of the center line portion LMC>the density value of the peripheral line portion LMP, or may be a relationship that the density value of the center line portion LMC<the density value of the peripheral line portion LMP. The density value of 0 is applied to the center line portion LMC or the peripheral line portion LMP to which a lower density value is applied, and for example, the ink does not have to be dropped. It is preferable that each of the plurality of line marks LM has a common shape.

FIG. 2 shows the plurality of line marks LM having the same shape. Examples of the line mark LM having a common shape instead of the same shape include a case in which the sizes of the center line portions LMC are different, a case in which the density values of the center line portions LMC are different, a case in which the sizes of the peripheral line portions LMP are different, and a case in which the density values of the peripheral line portions LMP are different.

Content of Density Step Pattern

The density step pattern SP has a plurality of density patterns CP extending in the first direction. The same density value is applied to each density pattern CP. The plurality of density patterns CP are disposed along the second direction in ascending order or descending order of the density values. FIG. 2 shows, as an example, the density step pattern SP in which the density value of the density pattern CP is increased from one end toward the other end in the second direction.

FIG. 2 shows, as an example, the density step pattern SP to which the density value of 8 stages is applied. However, the number of the density values need only be 2 or more including zero density value, and the density value other than zero may be 1 or more. A minimum density value of the density step pattern SP may be the density value of the center line portion LMC in the line mark LM. A maximum density value of the density step pattern SP may be the density value of the peripheral line portion LMP in the line mark LM.

Scan Configuration

An image sensor IS scans the test chart TC1 printed on the print medium to create the scan image of the test chart TC1. Hereinafter, the scan image may also be read as the scan image of the test chart.

The image sensor IS may be a line sensor having a structure in which sensor elements are arranged in a single line, or may be a two-dimensional sensor having a structure in which the sensor elements are arranged in a two-dimensional manner. The line sensor is advantageous in terms of a price.

In wide printing in which the line head is used, there is a case in which it is not possible to scan an entire width of the print medium by using one image sensor IS. In a case of the wide printing, a plurality of image sensors can be provided, each of the plurality of image sensors can be assigned to scan different regions, and the plurality of image sensors can be used to acquire the scan image corresponding to the entire width of the print medium.

In a case in which a plurality of image sensors IS are used, scan regions in the first direction partially overlap between the image sensors IS adjacent to each other in the first direction. FIG. 2 shows a case in which an overlap region of the scanning shown by an arrow line is set for two image sensors IS.

Size of Alignment Mark

In general, as the size of the alignment mark AM is relatively larger, it is more likely that a detection rate of the alignment mark AM is improved. The detection rate of the alignment mark AM is a ratio of the number of times of correct detection of the alignment mark AM to the number of attempts to detect the alignment mark AM.

In the printing of the test chart TC1, in a case in which a combination of the ink and the medium that easily bleed is used, and in a case of the printing that has many defects, such as streaks, there is a concern that information representing a feature of the alignment mark AM is insufficient in a case in which the size of the alignment mark AM is relatively small. On the other hand, in a case in which the size of the alignment mark AM is made relatively large, a disadvantage that the size of the test chart TC1 is increased can be generated. Therefore, it is preferable to adopt an aspect in which the size of the alignment mark can be freely adjusted by using a parameter, and the size of the alignment mark is adjusted according to the printing device and a printing condition. Details of the adjustment of the alignment mark will be described below.

Aspect Ratio of Alignment Mark

Detection processing of the alignment mark AM is executed with respect to the alignment mark portion of the scan image. Therefore, it is preferable that an aspect ratio of the alignment mark AM is an appropriate aspect ratio in the alignment mark portion of the scan image. For example, in a case in which it is preferable that the aspect ratio of the alignment mark AM is 1:1 for the detection processing of the alignment mark AM, in a case in which an aspect ratio of the print resolution and an aspect ratio of the scan resolution are different, it is required to constitute the test chart TC1 in which the aspect ratio of the alignment mark portion of the scan image is 1:1.

For example, in a case in which the print resolution is 1200×1200 dots per inch and the scan resolution is 100×600 dots per inch, it is preferable that the aspect ratio of the alignment mark AM constituted as the test chart TC1 is 6:1.

In a case in which the aspect ratio of the alignment mark AM is prescribed as described above, the aspect ratio of the alignment mark portion of the scan image is 1:1. It should be noted that the print resolution and the scan resolution described above are represented by using a format of a resolution in the second direction×a resolution in the first direction. It should be noted that the test chart TC1 shown in FIG. 2 is an example of a first test chart.

Specific Examples of Alignment Mark and Line Mark

FIG. 3 is a diagram showing specific examples of the alignment mark and the line mark shown in FIG. 2. The alignment mark AM shown in FIG. 3 has a pattern shape conforming to the ArUco marker. That is, in a case in which the first direction is a horizontal direction and the second direction is a vertical direction, the ArUco marker having the aspect ratio of 1:1 in the alignment mark AM is stretched 6 times in the second direction, and thus the aspect ratio is 6:1.

The same aspect ratio as the alignment mark AM is applied to the line mark LM shown in FIG. 3, and the aspect ratio is 6:1. In the line mark LM shown in FIG. 3, a ratio of the center line portion LMC to the peripheral line portion LMP in the first direction is 1:12.

In a case in which a ratio of the peripheral line portion LMP to the center line portion LMC in the first direction is made relatively large and the center line portion LMC is made relatively thin, the positional accuracy of the center line portion LMC is improved, but it can be difficult to recognize the center line portion LMC. On the other hand, in a case in which a ratio of the peripheral line portion LMP to the center line portion LMC in the first direction is made relatively small and the center line portion LMC is made relatively thick, it is easy to recognize the center line portion LMC, but the positional accuracy of the center line portion LMC can be decreased.

For the line mark LM, it is preferable to prepare a user interface that can adjust the ratio between the center line portion LMC and the peripheral line portion LMP in the first direction. For example, an adjustment screen for the line mark LM is displayed on a display device, and an operator operates an input device, such as a keyboard and a mouse, to set various conditions of the line mark LM.

Figure 4:
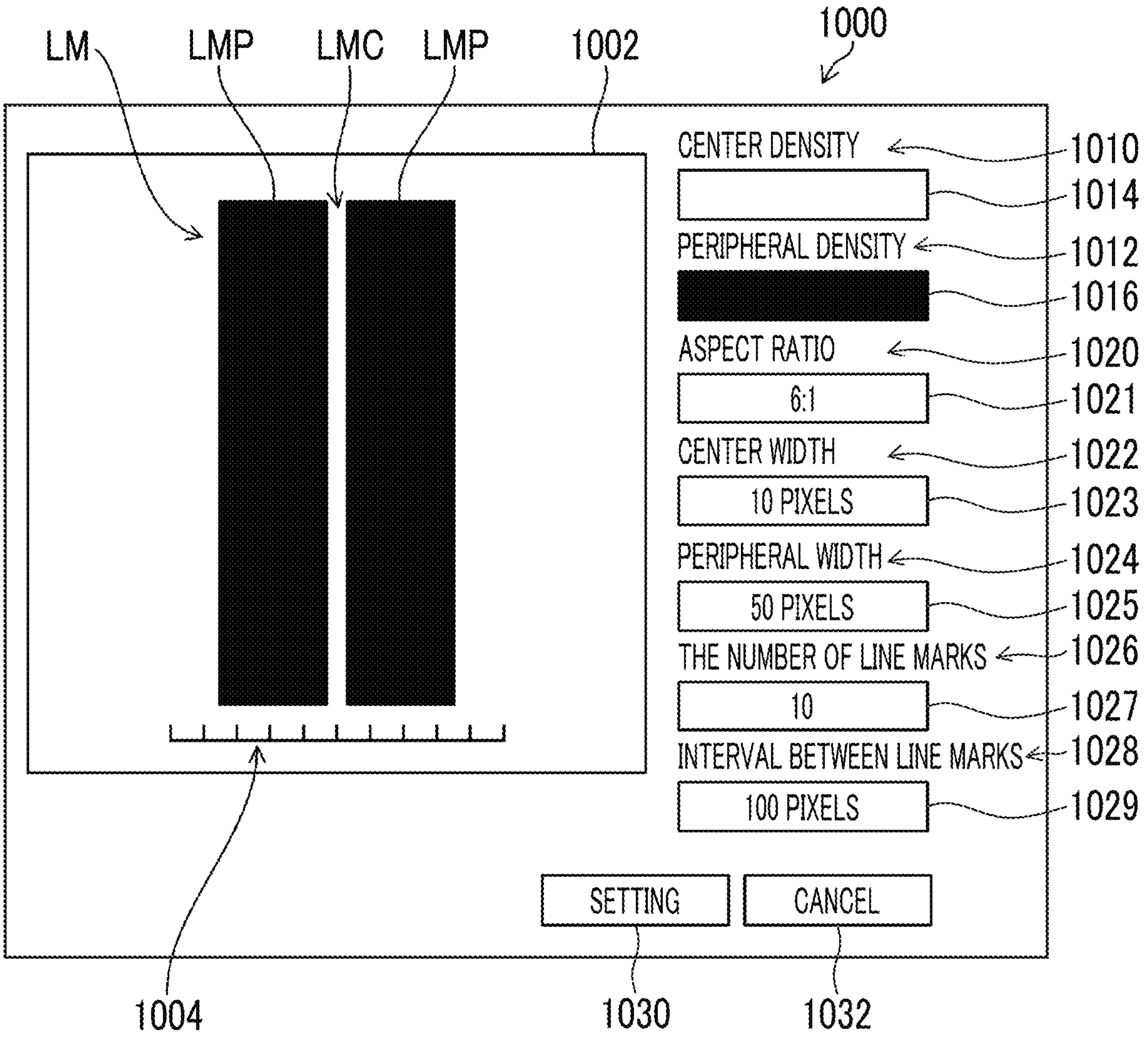
FIG. 4 is a schematic diagram showing an example of a line mark adjustment screen.

FIG. 4 is a schematic diagram showing an example of the line mark adjustment screen. A line mark display region 1002 on which the line mark LM is displayed in an enlarged manner is displayed on a line mark adjustment screen 1000 shown in FIG. 4. A scale 1004 is displayed below the line mark LM on the line mark display region 1002. The display or the non-display of the scale 1004 may be freely switched according to a user input and the like.

A center density setting portion 1010 for setting the density of the center line portion LMC, and a peripheral density setting portion 1012 for setting the density of the peripheral line portion LMP are displayed on the line mark adjustment screen 1000. The center density setting portion 1010 includes a center density input portion 1014 to which the density of the center line portion LMC is input. The density of the center line portion LMC can be input to the center density input portion 1014 by applying a pull-down menu. A format in which a numerical value representing the density value is input may be applied to the center density input portion 1014.

The peripheral density setting portion 1012 includes a peripheral density input portion 1016 to which the density of the peripheral line portion LMP is input. The peripheral density input portion 1016 can have the same configuration as the center density input portion 1014.

An aspect ratio setting portion 1020 for setting the aspect ratio of the line mark LM is displayed on the line mark adjustment screen 1000. The aspect ratio setting portion 1020 includes an aspect ratio input portion 1021 to which the aspect ratio of the line mark LM is input. A format in which a numerical value representing the aspect ratio of the line mark LM is input can be applied to the aspect ratio input portion 1021. The numerical value applied to the aspect ratio may be an integer or a numerical value having a decimal point part.

A center width setting portion 1022 for setting a width of the center line portion LMC is displayed on the line mark adjustment screen 1000. The center width setting portion 1022 includes a center width input portion 1023 to which the width of the center line portion LMC is input. A format in which a numerical value representing the width of the center line portion LMC is input can be applied to the center width input portion 1023. The width of the center line portion LMC is a length of the center line portion LMC in the first direction. In the center width setting portion 1022, the width of the center line portion LMC may be set in units of one pixel.

A peripheral width setting portion 1024 for setting a width of the peripheral line portion LMP is displayed on the line mark adjustment screen 1000. The peripheral width setting portion 1024 includes a peripheral width input portion 1025 to which the width of the peripheral line portion LMP is input. A format in which a numerical value representing the width of the peripheral line portion LMP is input can be applied to the peripheral width input portion 7025. The width of the peripheral line portion LMP is a length of the peripheral line portion LMP in the first direction.

A length in the first direction of any one of two peripheral line portions LMP that interpose the center line portion LMC can be applied to the width of the peripheral line portion LMP. The widths of the two peripheral line portions LMP that interpose the center line portion LMC may be the same as each other or may be different from each other. In a case in which the widths of the two peripheral line portions LMP that interpose the center line portion LMC are different, the width can be set for each of the two peripheral line portions LMP. In the peripheral width setting portion 1024, the width of the peripheral line portion LMP may be set in units of one pixel.

A line mark number setting portion 1026 for setting the number of the line marks LM is displayed on the line mark adjustment screen 1000. The line mark number setting portion 1026 includes a line mark number input portion 1027 to which the number of the line marks LM is input. A format in which a numerical value representing the number of the line marks LM is input can be applied to the line mark number input portion 1027.

An interval setting portion 1028 for setting an interval between the line marks LM is displayed on the line mark adjustment screen 1000. The interval setting portion 1028 includes an interval input portion 1029 to which the interval between the line marks LM is input. A format in which a numerical value representing the interval of the line mark LM is input can be applied to the interval input portion 1029. In the interval setting portion 1028, the interval between the line marks LM may be set in units of one pixel.

The interval between the line marks LM is a distance between two line marks LM adjacent to each other in the first direction. A distance between the centers of the two line marks LM can be applied to the distance between the two line marks LM.

A setting button 1030 for confirming the setting, such as the aspect ratio of the line mark LM, and a cancel button 1032 for canceling the setting are displayed on the line mark adjustment screen 1000. The setting is confirmed in a case in which the setting button 1030 is operated, and the setting is canceled in a case in which the cancel button 1032 is operated.

It should be noted that, although not shown, a configuration in which the aspect ratio of the alignment mark AM shown in FIG. 3 can be adjusted can also be adopted. An alignment mark adjustment screen which is the same as the line mark adjustment screen 1000 shown in FIG. 4 is displayed on the display device, and the operator operates the input device, such as the keyboard and the mouse, to set various conditions of the alignment mark AM.

The line mark adjustment screen 1000 shown in FIG. 4 can function as a graphical user interface provided in a test chart data creation apparatus that creates test chart data representing the test chart TC1 shown in FIG. 2.

The graphical user interface provided in the test chart data apparatus can adjust at least any one of a parameter of the alignment mark AM or a parameter of the line mark LM.

Examples of the parameter of the alignment mark AM include the size of the alignment mark, the aspect ratio of the alignment mark, the density of the alignment mark, the number of the alignment marks, and the interval between the alignment marks adjacent to each other.

In addition, examples of the parameter of the line mark LM include the size of the line mark, the aspect ratio of the line mark, the density of the line mark, the number of the line marks, and the interval between the line marks adjacent to each other.

As another example of the parameter of the line mark LM, there are the density of the center line portion LMC, the width of the center line portion LMC, the density of the peripheral line portion LMP, and the width of the peripheral line portion LMP.

A computer is applied to the test chart data creation apparatus. The test chart data creation apparatus comprises one or more processors and one or more memories, and the one or more processors execute a command of programs stored in the one or more memories to implement various functions of the test chart data creation apparatus.

It should be noted that the parameter of the alignment mark AM described in the embodiment is an example of an alignment mark parameter. The parameter of the line mark LM described in the embodiment is an example of a line mark parameter. The center line portion LMC described in the embodiment is an example of a low density portion having a relatively low density value. The peripheral line portion LMP described in the embodiment is an example of a high density portion having a higher density value than a low density portion. The width of the center line portion LMC described in the embodiment is an example of a length of the low density portion in the first direction. The width of the peripheral line portion LMP described in the embodiment is an example of a length of the high density portion in the first direction.

Modification Example of Test Chart

Due to the configuration of the ink jet head, there is a possibility that the density distribution in the first direction at any first position in the second direction fluctuates by the influence of the density distribution at a second position different from the first position in the second direction.

In particular, in a case in which physical dispositions of a plurality of nozzle openings provided in the ink jet head are distributed in a two-dimensional manner and the plurality of nozzle openings different from each other are connected to the same common flow passage, the above-described phenomenon called a crosstalk phenomenon is likely to occur.

In a case in which the crosstalk phenomenon occurs, due to the density distribution of the alignment mark AM and the like, there is a concern that the density distribution of the portion of the density step pattern SP close to the alignment mark AM and the like is affected, pseudo density unevenness occurs, and the pseudo density unevenness is overcorrected. Therefore, it is preferable that the alignment mark AM and the like are physically separated from the density step pattern SP by a certain distance in the second direction.

Figure 5:
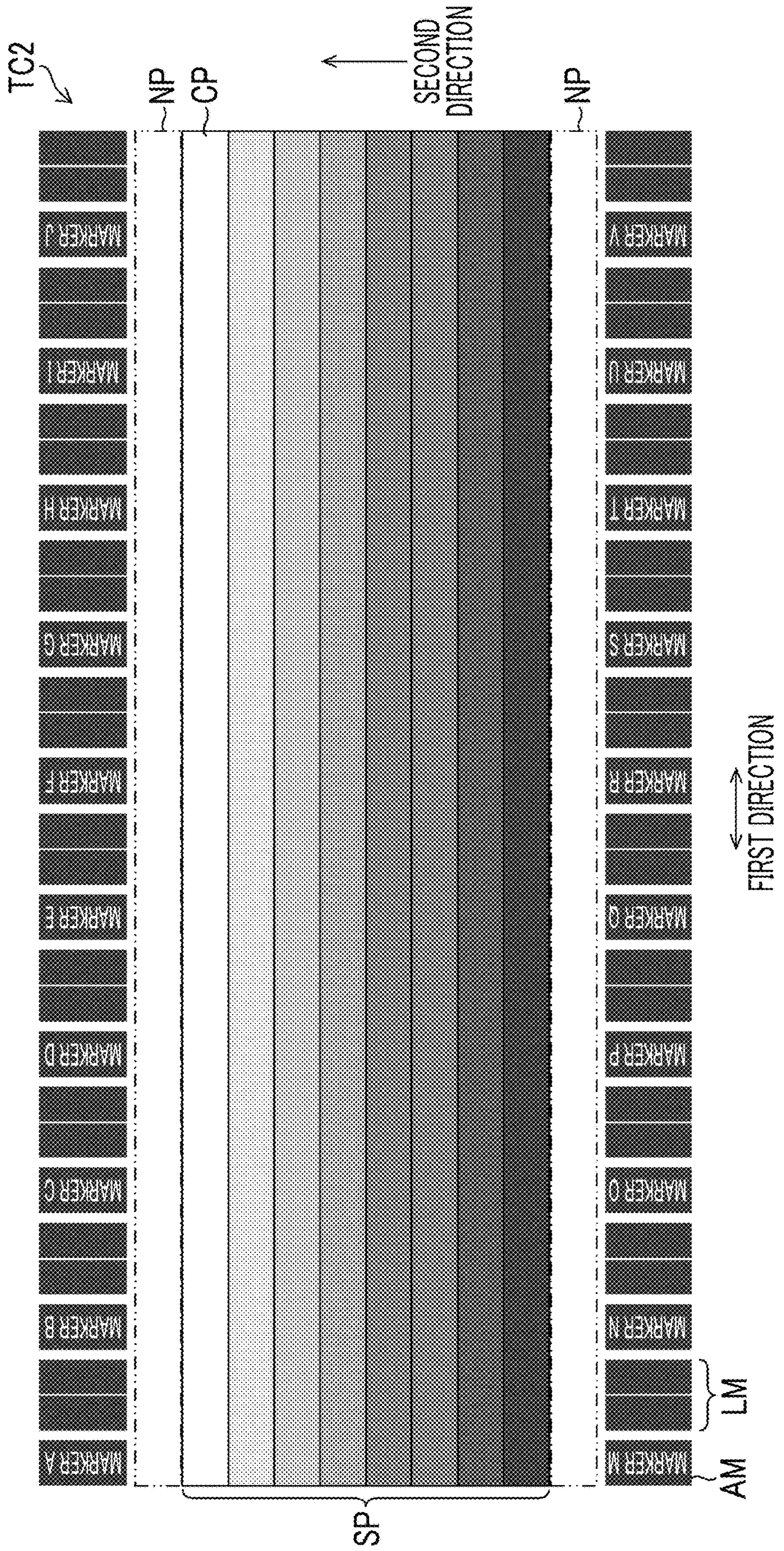
FIG. 5 is a schematic diagram showing a modification example of the test chart shown in FIG. 2.

FIG. 5 is a schematic diagram showing the modification example of the test chart shown in FIG. 2. In a test chart TC2 shown in FIG. 5, a non-pattern portion NP is provided between the alignment mark AM and the line mark LM, and the density step pattern SP in the second direction. FIG. 5 shows the non-pattern portion NP by using a two-point chain line.

The non-pattern portion NP shown in FIG. 5 is prescribed to have a sufficient length in the second direction so that the influence of the crosstalk can be ignored. The length of the non-pattern portion NP in the second direction depends on the configuration of the ink jet head in which the nozzles are disposed in a two-dimensional manner.

For example, in a period in which any nozzle group prints the density pattern CP, there is a case in which another nozzle group can print the alignment mark AM and the line mark LM. In this case, in a case in which the nozzle group that prints the density pattern CP and the nozzle group that prints the alignment mark AM and the like receive the ink supplied from the same flow passage inside the ink jet head, the printing of the density pattern CP may be affected by the printing of the alignment mark AM and the like. Similarly, the printing of the alignment mark AM and the like may be affected by the printing of the density pattern CP.

Since the alignment mark AM and the line mark LM are not uniform patterns, despite the fact that original uniform pattern is printed in the printing of the density pattern CP, there is a possibility that the printing having a correlation with the printing of the alignment mark AM and the like is executed. This phenomenon is referred to as crosstalk.

In a state in which the crosstalk occurs in the printing of the density pattern CP, in a case in which the density correction is executed by using the density pattern CP, as a result of the non-uniform pattern of the density pattern CP being recognized as unevenness, overcorrection may be executed.

In a case in which the density pattern CP is printed, a state is preferable in which the printing of the alignment mark AM and the like has a uniform pattern in at least the first direction, which is the direction in which a characteristic of the unevenness correction is acquired, and as a method thereof, the non-pattern portion NP having a sufficient length in the second direction is provided.

The density pattern CP similar to the density pattern CP close thereto may be disposed in the non-pattern portion NP. For example, the density pattern CP to which the same density value as the adjacent density pattern CP is applied may be disposed in the non-pattern portion NP.

The test chart TC2 shown in FIG. 5 is also effective in terms of improving the robustness of the lens provided in the image sensor IS shown in FIG. 2 with respect to flare. The length of the non-pattern portion NP in the second direction can be prescribed as appropriate according to a condition of the ink jet head, a combination of the print medium and the ink, and the like. A user interface that adjusts the length of the non-pattern portion NP in the second direction may be prepared. It should be noted that the test chart TC2 shown in FIG. 5 is an example of a first test chart.

Details of Density Unevenness Correction Data Creation

Figure 6:
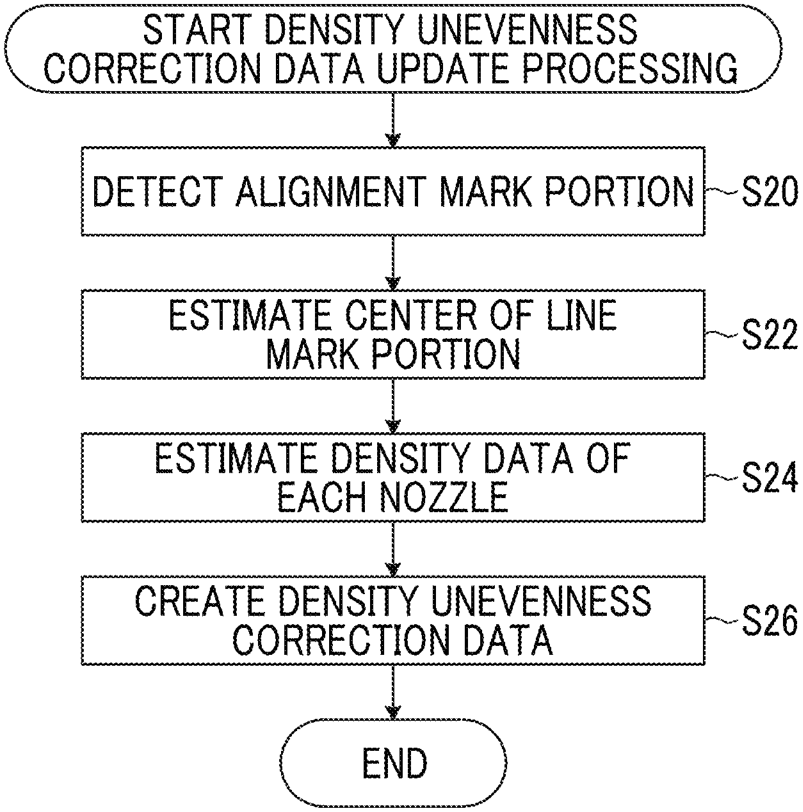
FIG. 6 is a flowchart showing a procedure of a density unevenness correction data update processing step shown in FIG. 1.

FIG. 6 is a flowchart showing a procedure of the density unevenness correction data update processing step shown in FIG. 1. The density unevenness correction data update processing step is composed of an alignment mark portion detection step S20, a line mark portion center position estimation step S22, a density data estimation step S24, and a density unevenness correction data creation step S26.

Alignment Mark Portion Detection Step

In the alignment mark portion detection step S20, the image processing is executed with respect to the scan image, and the alignment mark portion is detected from the scan image. Each of the plurality of alignment marks AM has a unique shape, and it is possible to acquire correspondence relationship information representing a correspondence relationship between a theoretical position and a scan position by using the information on the detected alignment mark portion. The correspondence relationship information can include a correspondence relationship in the first direction and a correspondence relationship in the second direction. It should be noted that the scan position described in the embodiment is an example of an imaging position. The step of acquiring the correspondence relationship information by using the detection information of the alignment mark portion described in the embodiment is an example of a correspondence relationship information acquisition step. Hereinafter, in some cases, the acquisition of the correspondence relationship information is described as the acquisition of the correspondence relationship.

Here, the acquisition of the correspondence relationship information can include the concept of deriving the correspondence relationship by using the information on the theoretical position and the information on the scan position, such as an aspect of calculating the correspondence relationship and an aspect of estimating the correspondence relationship. In addition, from the information on the correspondence relationship between the theoretical position and the scan position, the correspondence relationship between the theoretical position and the scan position can be acquired for any coordinate. As a result, the problem 4 described above can be solved.

The theoretical position is a collective term for a theoretical position of the alignment mark AM on the test chart TC1 and a theoretical position of the line mark LM on the test chart TC1. Hereinafter, in some cases, the theoretical position of the alignment mark AM on the test chart TC1 and the theoretical position of the line mark LM on the test chart TC1 are distinguished from each other and described as the theoretical position of the alignment mark AM and the like.

In addition, the scan position is a collective term for an actual position of the alignment mark portion in the scan image and an actual position of the line mark portion in the scan image. In some cases, the actual position of the alignment mark portion in the scan image and the actual position of the line mark portion in the scan image are distinguished from each other and described as the scan position of the scan line mark portion and the like.

The correspondence relationship between the theoretical position and the scan position can be grasped as a correspondence relationship between the theoretical position of the alignment mark AM and the scan position of the alignment mark portion or a correspondence relationship between the theoretical position of the line mark LM and the scan position of the line mark portion. The correspondence relationship between the theoretical position of the alignment mark AM and the scan position of the alignment mark portion is grasped as a rough correspondence relationship. The correspondence relationship between the theoretical position of the line mark LM and the scan position of the line mark portion can be grasped as a detailed correspondence relationship. The rough correspondence relationship described in the embodiment is an example of a rough correspondence relationship, and the detailed correspondence relationship is an example of a detailed correspondence relationship.

In the alignment mark portion detection step S20, in a case in which the correspondence relationship between the theoretical position and the scan position is acquired for the first direction and the second direction, the line mark portion center position estimation step S22 is executed. It should be noted that the alignment mark portion detection step S20 described in the embodiment is an example of an alignment mark detection step.

Number of Alignment Marks That Is Required to Be Detected

In a two-dimensional coordinate system in which an X direction and a Y direction are prescribed, in order to obtain the rough correspondence relationship, an amount of information that can define two linearly independent vectors is required. That is, it is required to detect three or more alignment marks AM having different directions for one image sensor IS. On the other hand, a larger number of the alignment marks AM may be detected, and in a case in which a large number of the alignment marks AM are detected, the correspondence relationship can be obtained from the position of each alignment mark AM in a minimum square manner. In addition, the correspondence relationship may be obtained from the position of each alignment mark AM in a divisional complementary manner. In a case in which a large number of the alignment marks AM are detected, the accuracy of the correspondence relationship can be improved. It should be noted that the position of each alignment mark AM described in the embodiment is an example of a position of each alignment mark.

Definition of Reference Position of Alignment Mark

In order to acquire the rough correspondence relationship, it is required to determine which position of one alignment mark AM is used as a reference. As an example, the center position of the alignment mark AM in the up, down, left, and right directions can be set as the reference position. The center position in the up, down, left, and right directions can be grasped as two directions orthogonal to the up, down, left, and right directions.

As another example, any one of corner portions in the alignment mark AM can be used as the reference position. Examples of the corner portion include vertices of a quadrangle in a case in which an outer shape of the alignment mark AM is the quadrangle. In this way, the reference position can be defined in various ways.

Acquisition of Scan Mark Position

The theoretical position can be calculated theoretically, whereas the scan position is required to be estimated from the scan image. The scan image is a scan brightness image obtained by scanning the test chart TC1 by using the image sensor IS shown in FIG. 2.

In a case in which the reference position of the alignment mark AM is set to the center position of the up, down, left, and right directions, for example, in the scan image, a centroid position of the alignment mark portion can be obtained, and the reference position of the alignment mark portion can be estimated from the centroid position of the alignment mark portion. Alternatively, the image processing, such as edge detection processing, can be executed to estimate a plurality of edges and a plurality of corners of the alignment mark portion, and then a midpoint of the plurality of edges or a midpoint of the plurality of corners can be obtained to estimate the reference position of the alignment mark portion from the midpoint of the plurality of edges.

Accuracy of Correspondence Relationship

The accuracy of the correspondence relationship is affected by the estimation accuracy of the scan position. For example, in a case in which the scan position is estimated at a level of the resolution of the image sensor IS, the accuracy of the correspondence relationship is equal to or lower than the level of the resolution of the image sensor IS. In a case in which the density unevenness correction data is created based on the rough correspondence relationship obtained by using the alignment mark AM, as described in the problems 1-A to 1-D described above, there is a concern that the accuracy of the density unevenness correction data is insufficient. On the other hand, in the density unevenness correction data creation method according to the present embodiment, the correspondence relationship in the first direction, in which high accuracy is required, is obtained by using the detailed correspondence relationship obtained by using the line mark LM.

Line Mark Portion Center Position Estimation Step

In the line mark portion center position estimation step S22, the center position of the line mark portion in the scan image is estimated by using the rough correspondence relationship acquired in the alignment mark portion detection step S20. It should be noted that the line mark portion center position estimation step S22 described in the embodiment is an example of a line mark position estimation step.

Specifically, since the rough correspondence relationship is acquired in the alignment mark portion detection step S20, it is possible to specify an approximate position of the line mark portion without individually detecting the line mark portions from the scan image. The approximate position of the line mark portion is the position of the line mark portion at the level of the resolution of the image sensor IS. Therefore, all the line marks LM may have the same shape.

The processing executed with respect to the line mark portion of the scan image is processing of estimating the position of the line mark portion in the first direction with high accuracy, and obtaining the detailed correspondence relationship between the theoretical position and the scan position for the first direction. The theoretical position can be represented by applying the coordinate prescribed in the medium. The scan position is estimated from the theoretical position by using the correspondence relationship between the theoretical position and the scan position.

As the estimation accuracy of the center position of the line mark portion, higher accuracy than the estimation accuracy of the position of the alignment mark portion is required. It is required that the estimation accuracy of the center position of the line mark portion can be estimated at a resolution higher than the resolution of the scan image. Various methods can be considered as the estimation method of the high resolution, and the following procedure can be applied as the estimation method of the high resolution.

<1>

The line mark portion of the scan image is subjected to averaging processing or integration processing in the second direction and converted into one-dimensional data.

<2>

Blur filter processing using a blur filter is executed with respect to the one-dimensional data.

<3>

A brightness peak position of the data subjected to the blur filter processing is obtained. The derivation of the brightness peak position is executed with the accuracy of the level of the scan resolution.

<4>

A detailed peak position is estimated at a subpixel level by using brightness gradient information between the peak position and the position before and after the peak position.

Number of Line Marks

Since the accuracy of the detailed correspondence relationship can be more improved as the number of the line marks LM is larger, basically, a larger number of the line marks LM is better. It is preferable that the number of the line marks LM, the interval between the line marks LM in the first direction, and the like can be freely set, and the interval between the line marks LM in the first direction can be set as appropriate. As an example of a user interface that sets the number of the line marks and the like, the line mark adjustment screen 1000 is shown in FIG. 4.

Width of Center Line Portion

It is preferable that the width of the center line portion LMC in the line mark LM can be freely set, and the width of the center line portion LMC in the line mark LM can be set as appropriate. For example, in a combination of the print medium and the ink in which the bleeding is relatively large, in a case in which the width of the center line portion LMC is relatively small, there is a concern that the center line portion LMC disappears due to the bleeding of the ink. The width of the center line portion LMC can be set as appropriate to avoid the disappearance of the center line portion LMC and the like.

Density Data Estimation Step

In the density data estimation step S24, the detailed correspondence relationship is used for the first direction, the rough correspondence relationship is used for the second direction, and the density value of each nozzle is estimated from each density pattern CP of the density step pattern SP. The density value of each nozzle corresponds to the density value of each position in the first direction.

Specifically, for each density pattern CP, the theoretical position of one point in the first direction of each nozzle is obtained from the scan position. The scan image is averaged or calculated within a region of the density pattern CP for each density in the second direction with respect to the obtained theoretical position in the first direction, and the density value of each density pattern CP of each nozzle is estimated.

Processing Without Image Deformation

In the apparatus described in JP6897992B, the scan image of the test pattern is deformed in a two-dimensional manner. As described in the problem 2 described above, the image deformation can cause problems, such as consumption of calculation resources and an increase in calculation time. Therefore, in the density unevenness correction data creation method according to the present embodiment, the density value of each density pattern CP of each nozzle is estimated as described above. As a result, the resource reduction of the calculation is implemented, and the speed-up of the calculation is implemented. It should be noted that the density value of each density pattern CP described in the embodiment is an example of a density value of each density pattern.

Density Unevenness Correction Data Creation Step

In the density unevenness correction data creation step S26, an input gradation value for flattening the density distribution in the first direction is obtained for each nozzle from characteristic data representing a relationship between the input gradation value and the output density of each nozzle, and the density unevenness correction data is created. The created density unevenness correction data is stored as the latest density unevenness correction data.

Figure 7:
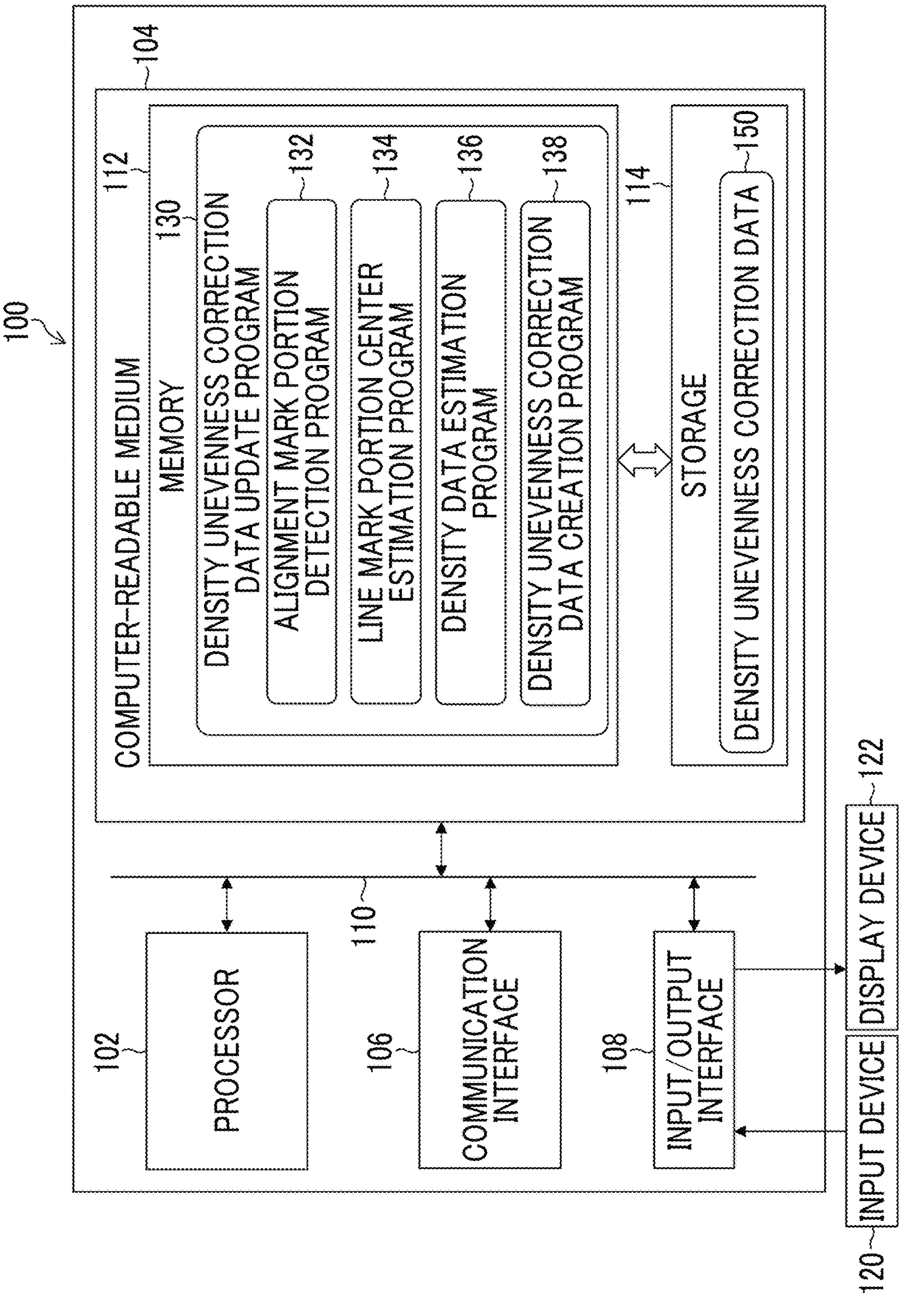
FIG. 7 is a block diagram schematically showing an example of a hardware configuration of an electric configuration of a density unevenness correction data creation apparatus according to the first embodiment.

Configuration Example of Density Unevenness Correction Data Creation Apparatus According to First Embodiment FIG. 7 is a block diagram schematically showing an example of a hardware configuration of an electric configuration of the density unevenness correction data creation apparatus according to the first embodiment. The computer comprising the one or more processors and the one or more memories is applied to the density unevenness correction data creation apparatus. A form of the computer may be a server, a personal computer, a workstation, a tablet terminal, and the like.

A density unevenness correction data creation apparatus 100 comprises a processor 102, a computer-readable medium 104 that is a non-transitory tangible object, a communication interface 106, and an input/output interface 108.

The processor 102 includes a central processing unit (CPU). The processor 102 may include a graphics processing unit (GPU). The processor 102 is connected to the computer-readable medium 104, the communication interface 106, and the input/output interface 108 via a bus 110. An input device 120 and a display device 122 are connected to the bus 110 via the input/output interface 108.

The computer-readable medium 104 includes a memory 112 that is a main storage device, and a storage 114 that is an auxiliary storage device. A semiconductor memory, a hard disk apparatus, a solid state drive apparatus, and the like can be applied to the computer-readable medium 104. Any combination of a plurality of apparatuses can be applied to the computer-readable medium 104.

It should be noted that the hard disk apparatus can be referred to as HDD that is an abbreviation for hard disk drive in English. The solid state drive apparatus can be referred to as SSD that is an abbreviation for solid state drive in English notation.

The density unevenness correction data creation apparatus 100 is connected to a network via the communication interface 106, and is communicably connected to an external device. A local area network (LAN) and the like can be applied to the network. It should be noted that the network is not shown.

The computer-readable medium 104 stores a density unevenness correction data update program 130. The density unevenness correction data update program 130 includes an alignment mark portion detection program 132, a line mark portion center estimation program 134, a density data estimation program 136, and a density unevenness correction data creation program 138.

The density unevenness correction data update program 130 implements a function of creating the density unevenness correction data and updating the density unevenness correction data by executing each step shown in FIG. 6. Latest updated density unevenness correction data 150 is stored in the storage 114. The density unevenness correction data before being updated may be stored with identification information added separately from the latest density unevenness correction data 150.

The alignment mark portion detection program 132 is applied to the alignment mark portion detection step S20 shown in FIG. 6. The line mark portion center estimation program 134 is applied to the line mark portion center position estimation step S22. The density data estimation program 136 is applied to the density data estimation step S24. The density unevenness correction data creation program 138 is applied to the density unevenness correction data creation step S26.

Various programs stored in the computer-readable medium 104 include one or more commands. Various types of data, various parameters, and the like are stored in the computer-readable medium 104.

In the density unevenness correction data creation apparatus 100, the processor 102 executes various programs stored in the computer-readable medium 104 to implement various functions in the density unevenness correction data creation apparatus 100. It should be noted that the term "program" is synonymous with the term "software".

The density unevenness correction data creation apparatus 100 executes data communication with the external device via the communication interface 106. Various standards, such as universal serial bus (USB), can be applied to the communication interface 106. Either wired communication or wireless communication may be applied to a communication form of the communication interface 106.

In the density unevenness correction data creation apparatus 100, the input device 120 and the display device 122 are connected via the input/output interface 108. The input device, such as the keyboard and the mouse, is applied to the input device 120. The display device 122 displays various types of information applied to the density unevenness correction data creation apparatus 100. For example, the display device 122 can display the line mark adjustment screen 1000 shown in FIG. 4.

A liquid crystal display, an organic EL display, a projector, and the like can be applied to the display device 122. Any combination of a plurality of devices can be applied to the display device 122. It should be noted that EL of the organic EL display is an abbreviation for electro-luminescence.

Here, examples of the hardware structure of the processor 102 include a CPU, a GPU, a programmable logic device (PLD), and an application specific integrated circuit (ASIC). The CPU is a general-purpose processor that executes the program and acts as various functional units. The GPU is a processor specialized in the image processing.

The PLD is a processor in which a configuration of an electric circuit can be changed after manufacturing the device. Examples of the PLD include a field programmable gate array (FPGA). The ASIC is a processor comprising a dedicated electric circuit specifically designed to execute specific processing.

One processing unit may be configured by using one of these various processors or may be configured by using two or more processors of the same type or different types. Examples of a combination of the various processors include a combination of one or more FPGAs and one or more CPUs, and a combination of one or more FPGAs and one or more GPUs. As another example of the combination of the various processors, there is a combination of one or more CPUs and one or more GPUs.

A plurality of functional units may be configured by using one processor. As an example in which the plurality of functional units are configured by using one processor, there is an aspect in which one processor is configured by applying a combination of one or more CPUs and software, such as system on a chip (SoC) represented by the computer, such as a client or a server, and this processor is made to act as the plurality of functional units.

As another example in which the plurality of functional units are configured by using one processor, there is an aspect in which a processor that implements the functions of the entire system including the plurality of functional units by using one IC chip is used. It should be noted that IC is an abbreviation for an integrated circuit.

As described above, various functional units are configured by using one or more of the various processors described above as the hardware structure. Further, the hardware structure of these various processors is, more specifically, an electric circuit (circuitry) in which circuit elements, such as semiconductor elements, are combined.

The computer-readable medium 104 can include semiconductor elements, such as a read only memory (ROM), a random access memory (RAM), and an solid state drive (SSD). The computer-readable medium 104 can include a magnetic storage medium, such as a hard disk. The computer-readable medium 104 can include a plurality of types of storage media.

Figure 8:
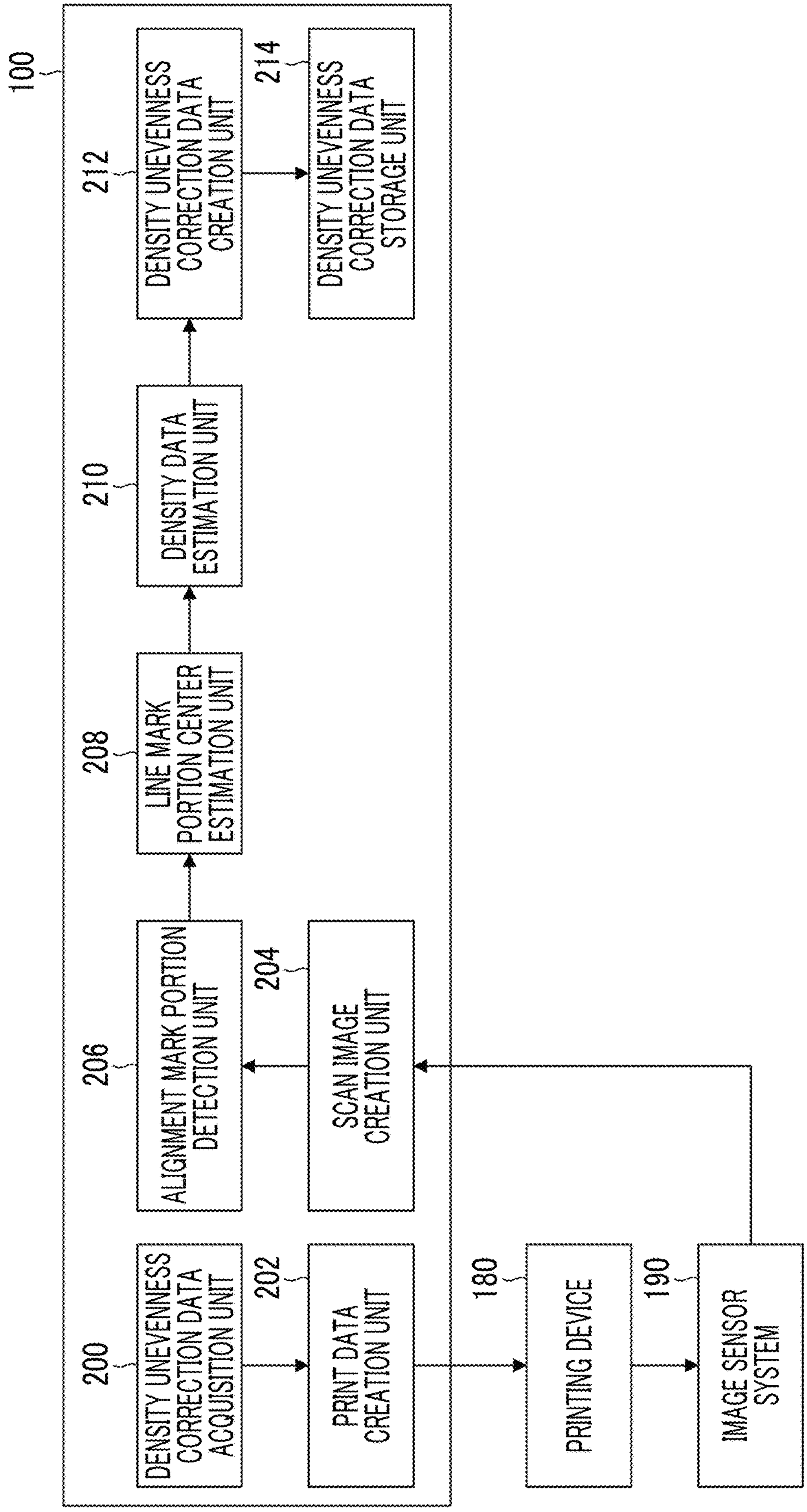
FIG. 8 is a functional block diagram showing an electric configuration of the density unevenness correction data creation apparatus shown in FIG. 7.

FIG. 8 is a functional block diagram showing the electric configuration of the density unevenness correction data creation apparatus shown in FIG. 7. The density unevenness correction data creation apparatus 100 comprises a density unevenness correction data acquisition unit 200, a print data creation unit 202, and a scan image creation unit 204.

The density unevenness correction data acquisition unit 200 executes the density unevenness correction data acquisition step S10 shown in FIG. 1. The density unevenness correction data acquisition unit 200 acquires the latest density unevenness correction data from a density unevenness correction data storage unit 214.

In FIG. 7, the latest density unevenness correction data acquired from the density unevenness correction data storage unit 214 is not shown. The latest density unevenness correction data is shown in FIG. 6 as the density unevenness correction data 150. In addition, the density unevenness correction data storage unit 214 shown in FIG. 8 is provided in the storage 114 shown in FIG. 7.

The print data creation unit 202 executes the test chart printing step S12 by using a printing device 180. The scan image creation unit 204 executes the scan image creation step S14 by using an image sensor system 190.

The density unevenness correction data creation apparatus 100 comprises an alignment mark portion detection unit 206, a line mark portion center estimation unit 208, a density data estimation unit 210, a density unevenness correction data creation unit 212, and a density unevenness correction data storage unit 214.

The alignment mark portion detection unit 206 executes the alignment mark portion detection program 132 shown in FIG. 7 to execute processing of the alignment mark portion detection step S20 shown in FIG. 6. The line mark portion center estimation unit 208 executes the line mark portion center estimation program 134 to execute processing of the line mark portion center position estimation step S22.

The density data estimation unit 210 executes the density data estimation program 136 to execute processing of the density data estimation step S24. The density unevenness correction data creation unit 212 executes the density unevenness correction data creation program 138 to execute processing of the density unevenness correction data creation step S26. The density unevenness correction data creation unit 212 executes processing of storing the density unevenness correction data in the density unevenness correction data storage unit 214.

The density unevenness correction data acquisition unit 200 and the print data creation unit 202 shown in FIG. 8 may be provided in the external device of the density unevenness correction data creation apparatus 100. Examples of the external device of the density unevenness correction data creation apparatus 100 include a control device of the printing device 180.

Figure 9:
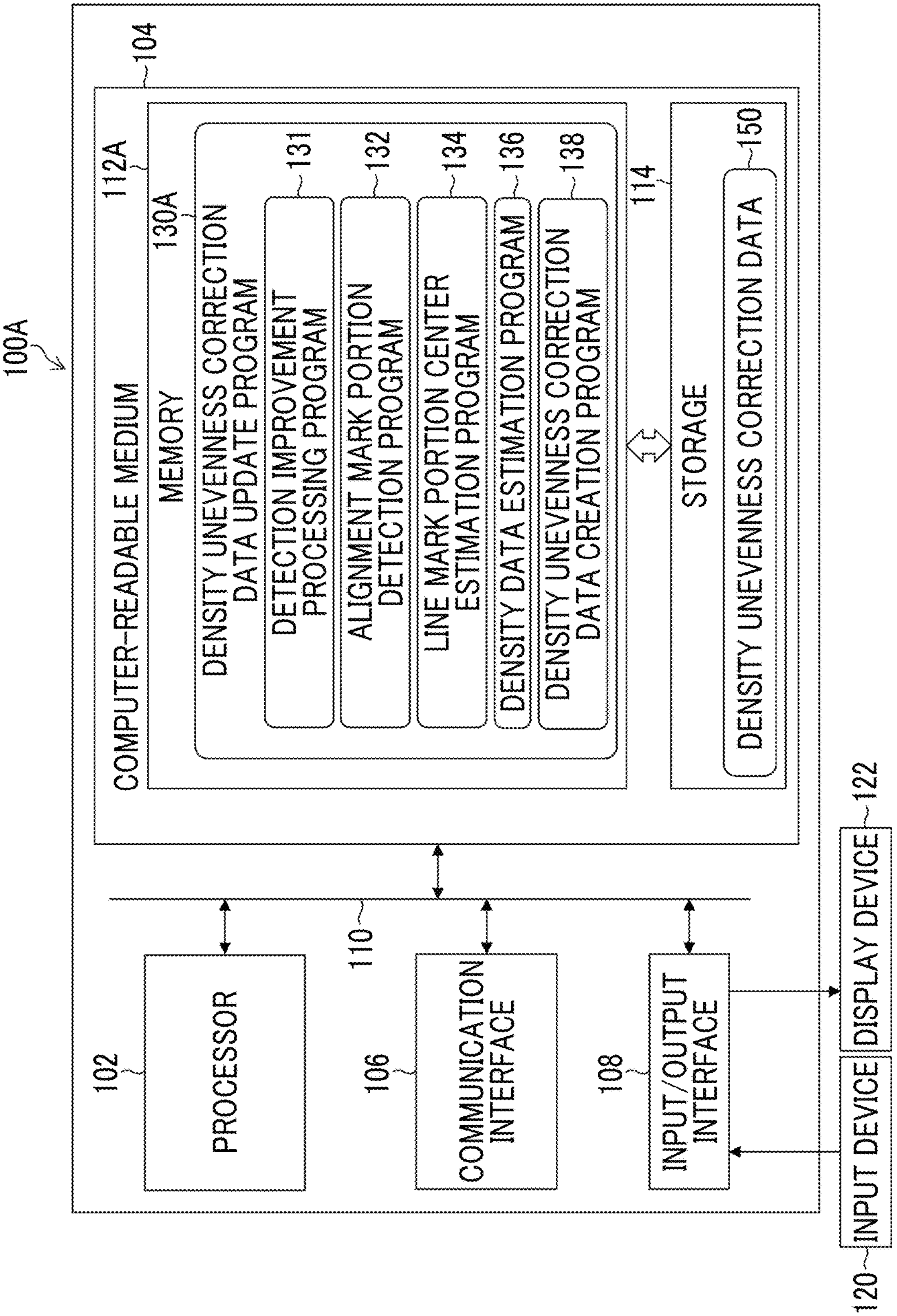
FIG. 9 is a block diagram schematically showing an example of a hardware configuration of an electric configuration of a density unevenness correction data creation apparatus according to a modification example.

Density Unevenness Correction Data Creation Apparatus According to Modification Example FIG. 9 is a block diagram schematically showing an example of a hardware configuration of an electric configuration of a density unevenness correction data creation apparatus according to the modification example. A density unevenness correction data creation apparatus 100A shown in FIG. 9 is provided with a memory 112A instead of the memory 112 shown in FIG. 7. In a density unevenness correction data update program 130A stored in the memory 112A, a detection improvement processing program 131 is added to various programs shown in FIG. 7. The detection improvement processing program 131 is executed in the alignment mark portion detection step S20 shown in FIG. 6.

Figure 10:
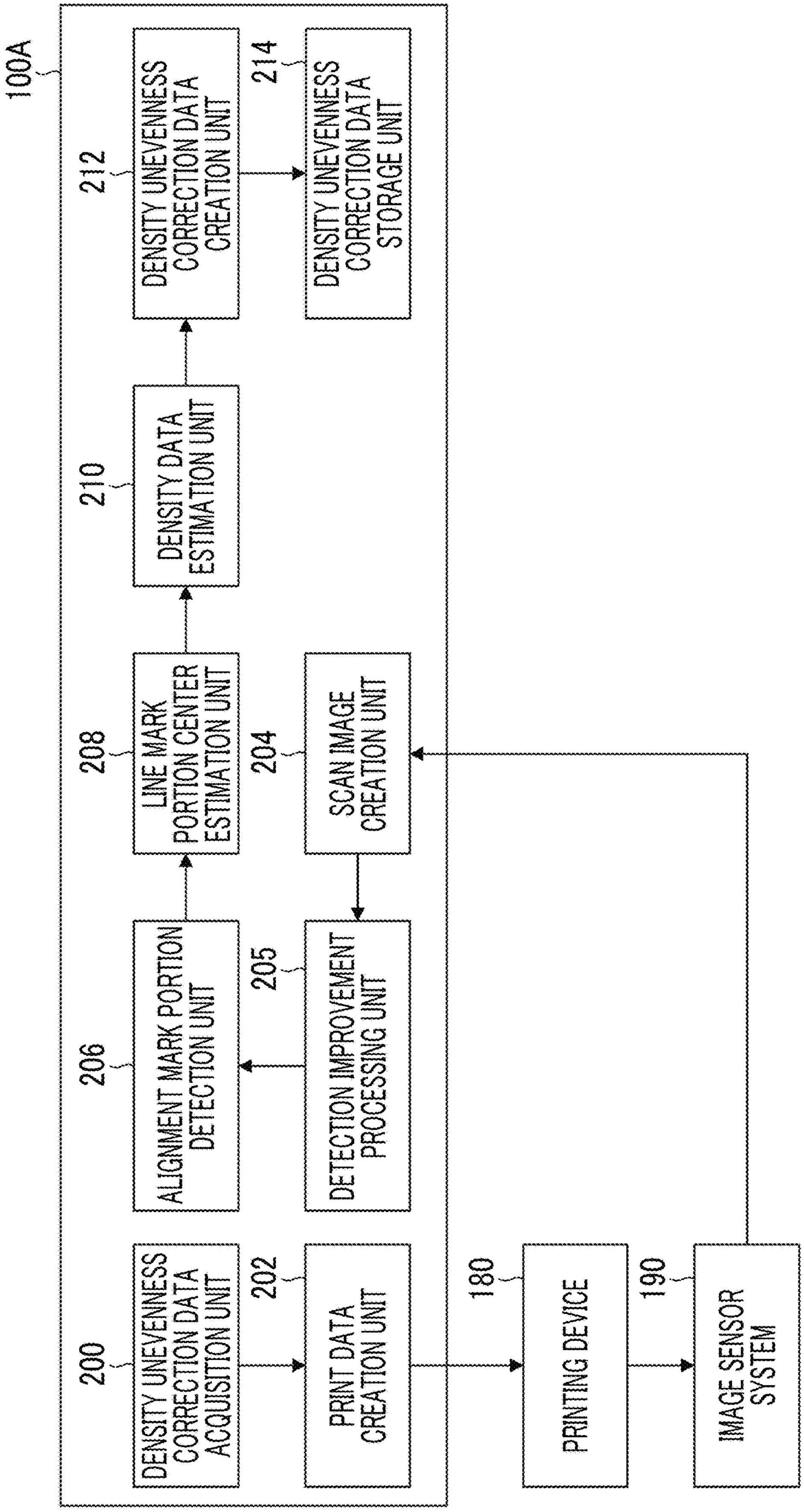
FIG. 10 is a functional block diagram showing an electric configuration of the density unevenness correction data creation apparatus shown in FIG. 9.

FIG. 10 is a functional block diagram showing the electric configuration of the density unevenness correction data creation apparatus shown in FIG. 9. In the density unevenness correction data creation apparatus 100A shown in FIG. 10, a detection improvement processing unit 205 is added to the density unevenness correction data creation apparatus 100 shown in FIG. 8.

The detection improvement processing unit 205 executes the detection improvement processing program 131 to execute detection improvement processing with respect to the alignment mark portion in a case in which the alignment mark portion is detected from the scan image. Hereinafter, a specific example of the detection improvement processing will be described. It should be noted that the step in which the detection improvement processing is executed described in the embodiment is an example of a detection improvement processing step.

First Example of Improvement in Detection Rate of Alignment Mark Portion Due to Preprocessing For example, in the printing of the single-pass method, in a case in which a jetting failure occurs in the nozzle provided in the ink jet head, a streak defect is likely to occur in the print image, and in some cases, the streak defect also occurs in the alignment mark AM. In a case in which the streak defect occurs in the alignment mark AM, a probability that the detection of the alignment mark portion in the scan image fails is relatively high.

In addition, in a case in which the scan image is created in a state in which dust and the like are attached to the print medium on which the test chart TC1 is printed, the probability that the detection of the alignment mark portion in the scan image fails is relatively high. Therefore, various types of preprocessing can be applied for the purpose of improving the detection rate of the alignment mark portion in the scan image before estimating the scan position.

Examples of the various types of preprocessing include filter processing in which a blur filter is applied to the scan image in advance, median filter processing, and morphology processing. Examples of the morphology processing include opening processing and closing processing. By executing the various types of preprocessing, it is possible to reduce the influence of printing defects, such as streak defects, and attachments, such as dust, on the detection of the alignment mark portion in the scan image.

Second Example of Improvement in Detection Rate of Alignment Mark Portion Due to Preprocessing A brightness contrast of the alignment mark portion in the scan image is likely to affect the detection rate of the alignment mark portion. In general, the detection rate is decreased in a case in which the brightness contrast is relatively low. Therefore, the detection of the alignment mark portion is executed in a state in which the brightness contrast of the alignment mark portion is enhanced. As a result, the detection rate of the alignment mark portion can be improved.

It should be noted that, in a case in which the contrast enhancement processing is excessively applied, there is a risk that overexposure, underexposure, and the like may occur in the alignment mark portion, and the detection rate may be decreased. Therefore, it is preferable to grasp the brightness contrast of the alignment mark portion in advance and to enhance the brightness contrast of the alignment mark portion within a range in which the overexposure and the underexposure do not occur.

On the other hand, it is difficult to grasp the brightness contrast of the alignment mark portion before the alignment mark portion is detected. For this problem, the alignment mark portion detection processing according to the following procedure is effective.

Figure 11:
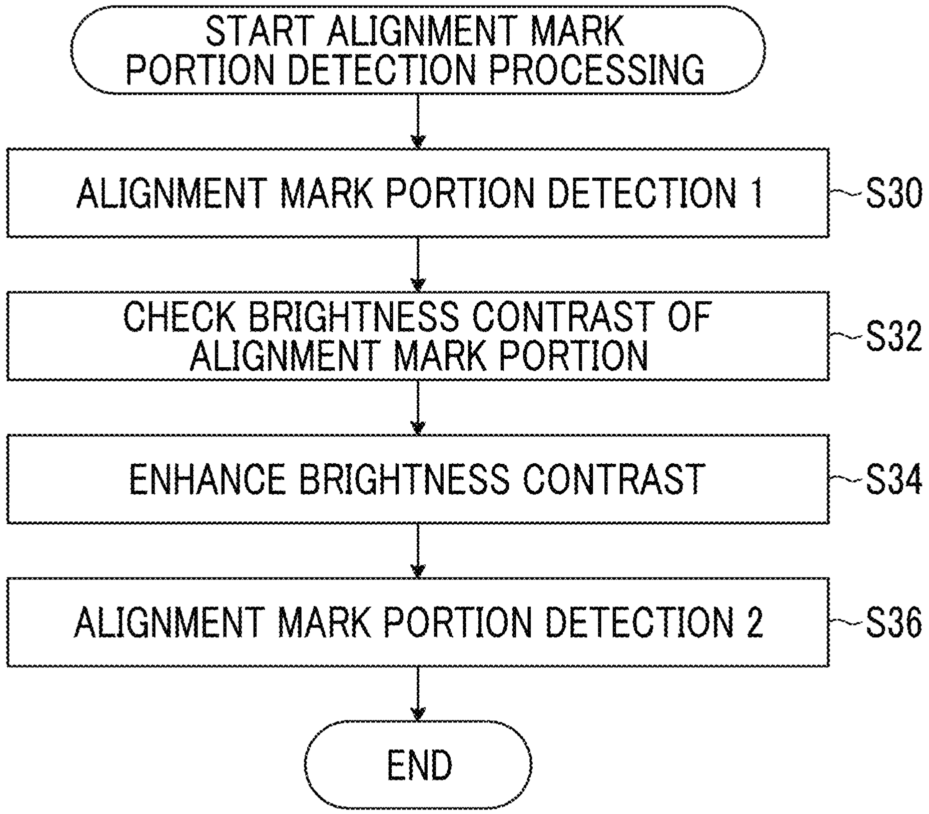
FIG. 11 is a flowchart showing a procedure of alignment mark portion detection processing.

FIG. 11 is a flowchart showing the procedure of the alignment mark portion detection processing. The procedure of the alignment mark portion detection processing shown in FIG. 11 can be grasped as a procedure of an alignment mark portion detection method. The alignment mark portion detection processing shown in FIG. 11 includes a first detection step S30 corresponding to alignment mark portion detection 1, a brightness contrast check step S32, a brightness contrast enhancement step S34, and a second detection step S36 corresponding to alignment mark portion detection 2.

In the first detection step S30, the alignment mark portion is detected without executing the contrast enhancement. In the first detection step S30, two or more alignment mark portions are detected. In the brightness contrast check step S32, the brightness contrast of each of the alignment mark portions is checked from the brightness information of each of the two or more alignment mark portions detected in the first detection step S30. In the brightness contrast check step S32, it is possible to grasp how much the brightness contrast is required to be enhanced with respect to the alignment mark portion.

In the brightness contrast enhancement step S34, an appropriate range of a brightness contrast enhancement amount is applied to the alignment mark portion according to the brightness contrast of the alignment mark portion checked in the brightness contrast check step S32 to execute enhancement processing of the alignment mark portion.

In the second detection step S36, the alignment mark portion is detected from the scan image in which the brightness contrast is enhanced with respect to the alignment mark portion in the brightness contrast enhancement step S34. In the second detection step S36, the improvement in the detection rate of the alignment mark portion is expected as compared with the first detection step S30.

After the second detection step S36, the processing proceeds to the brightness contrast check step S32, and the brightness contrast check step S32 and the brightness contrast enhancement step S34 may be executed to execute the second detection step S36, which is the second time, of executing the third detection of the alignment mark portion.

That is, after the second detection step S36, the brightness contrast check step S32 and the brightness contrast enhancement step S34 may be executed to further optimize a degree of contrast enhancement optimal for the detection of the alignment mark portion.

The second detection step S36, the brightness contrast check step S32, and the brightness contrast enhancement step S34 may be repeated a plurality of times to optimize the brightness contrast enhancement of the alignment mark portion.

Influence of Detection Rate Improvement Processing of Alignment Mark Portion on Estimation Accuracy of Scan Mark Position The detection rate improvement processing of the alignment mark portion has an effect of improving the detection rate of the alignment mark portion. However, there is a risk of reducing the estimation accuracy of the position of the alignment mark portion in the scan image due to some processing being executed with respect to the scan image. However, in the density unevenness correction data creation method according to the embodiment, the estimation accuracy of the position of the alignment mark portion is not so important, and even in a case in which the estimation accuracy of the position of the alignment mark portion is decreased, it does not pose a problem of the entire processing.

Non-Use of Image Sensor in which Alignment Mark Portion Is Not Detected

There is a possibility that the density unevenness correction is executed with respect to the print media having various sizes. In a case in which the size of the print medium used for the printing is relatively small and the plurality of image sensors IS are used, there is a possibility that only a specific image sensor IS scans the test chart TC1. In this case, the alignment mark portion is not detected from the scan image of another image sensor IS different from the specific image sensor IS. Therefore, the scan image created by using the image sensor IS in which the alignment mark portion is not detected from the scan image may be excluded from the subsequent processing, and only the scan image created by using the image sensor IS in which the alignment mark portion is detected may be used to execute the subsequent processing.

Processing with respect to Scan Image without Preprocessing for Detection of Alignment Mark Portion There is a possibility that the preprocessing executed in the detection of the alignment mark portion adversely affects the estimation of the center position of the line mark portion. Therefore, it is preferable to store the scan image that is not subjected to the preprocessing in the detection of the alignment mark portion, and to estimate the center position of the line mark portion for the scan image that is not subjected to the preprocessing. Of course, the preprocessing of improving the estimation accuracy of the center position of the line mark portion may be executed with respect to the scan image that is not subjected to the preprocessing. It should be noted that the scan image that is not subjected to the preprocessing described in the embodiment is an example of the test chart captured image that is not subjected to the detection improvement processing.

Removal of Data Having Low Accuracy

There is a risk that data having low accuracy due to some disturbance, such as a printing defect of the test chart and attachment of dust and the like to the test chart, is mixed in the estimated center position of the line mark portion. Therefore, it is possible to determine whether or not the data has low accuracy by using the rough correspondence relationship obtained based on the alignment mark portion. A procedure of detection of the data having low accuracy will be described below.

<1>

The rough correspondence relationship is applied to estimate the center position of each line mark portion.

<2>

The center position of the line mark portion estimated by applying the detailed correspondence relationship is compared with the center position of the line mark portion estimated by applying the rough correspondence relationship.

<3>

In a case in which a deviation between the center positions of the two types of line mark portions is relatively large, a determination is made that the accuracy of the center position of the line mark portion estimated by applying the detailed correspondence relationship is low.

In general, the center position of the line mark portion estimated by applying the rough correspondence relationship has better robustness against disturbance as compared with the center position of the line mark portion estimated by applying the detailed correspondence relationship. Therefore, it is possible to execute processing to which the procedure described above is applied to detect the data having low accuracy and to exclude the data having low accuracy from processing of deciding the detailed correspondence relationship. It should be noted that a case in which the deviation between the center positions of the two types of line mark portions described in the embodiment is relatively large is an example of the line mark in which a difference in the position for each line mark exceeds a prescribed range.

Actions and Effects of First Embodiment

The density unevenness correction data creation method and the density unevenness correction data creation apparatus according to the first embodiment can obtain the following actions and effects.

The alignment mark portion corresponding to the alignment mark AM is detected from the scan image of the test chart having the alignment mark AM and the line mark LM, and the rough correspondence relationship between the theoretical position and the scan position is acquired by using the detection result of the alignment mark portion.

The center position of the line mark portion is estimated by using the rough correspondence relationship, and the detailed correspondence relationship between the theoretical position and the scan position is acquired. The density unevenness correction data is created by using the detailed correspondence relationship for the first direction corresponding to the disposition direction of the nozzles of the ink jet head.

As a result, the printing system can execute the density unevenness correction with high accuracy by using the density unevenness correction data created by using the detailed correspondence relationship.

The data of the center position of the line mark portion having low accuracy is excluded from the data used in a case in which the detailed correspondence relationship is acquired by using the rough correspondence relationship for the first direction. As a result, the accuracy of the detailed correspondence relationship is improved, and the density unevenness correction data in which the detailed correspondence relationship is used can be created with high accuracy.

In a case in which the alignment mark portion is detected, the detection improvement processing is executed with respect to the scan image. As a result, the robustness in the detection of the alignment mark portion can be improved.

The density estimation is executed for each nozzle by using the correspondence relationship between the theoretical position and the scan position, and the density unevenness correction data is created by using the density estimation value of each nozzle. As a result, it is possible to create the density unevenness correction data without executing the image deformation processing having a large amount of consumption of the calculation resources and having a long processing time.

Second Embodiment

Handling Case in which Medium Shrinkage at Step Density is Large

Figure 12:
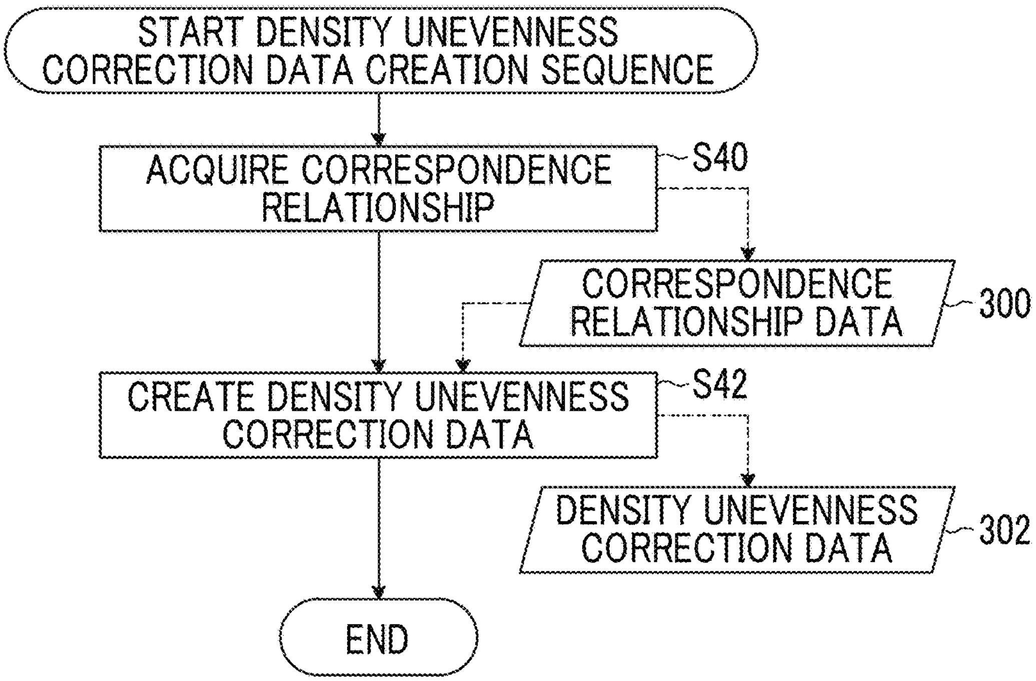
FIG. 12 is a flowchart showing an outline of a density unevenness correction data creation sequence.

FIG. 12 is a flowchart showing an outline of a density unevenness correction data creation sequence. In the description so far, the acquisition of correspondence relationship data 300 representing the correspondence relationship between the theoretical position and the scan position is executed in one density unevenness correction data creation sequence.

That is, in the density unevenness correction data creation sequence shown in FIG. 12, a correspondence relationship acquisition step S40 is executed to acquire the correspondence relationship data 300 representing the correspondence relationship between the theoretical position and the scan position, and a density unevenness correction data creation step S42 of the next step is executed to create density unevenness correction data 302 by using the correspondence relationship data 300.

However, as shown in the problem 3 described above, there is a case in which the correspondence relationship between the theoretical position and the scan position fluctuates according to the step density. In the following description of the second embodiment, a correspondence relationship acquisition sequence is prepared separately from the density unevenness correction data creation sequence. It should be noted that the step density is the density value applied to each density pattern CP of the density step pattern SP. It should be noted that the sequence shown in FIG. 12 is an example of a first sequence.

Introduction of Correspondence Relationship Acquisition Sequence

Figure 13:
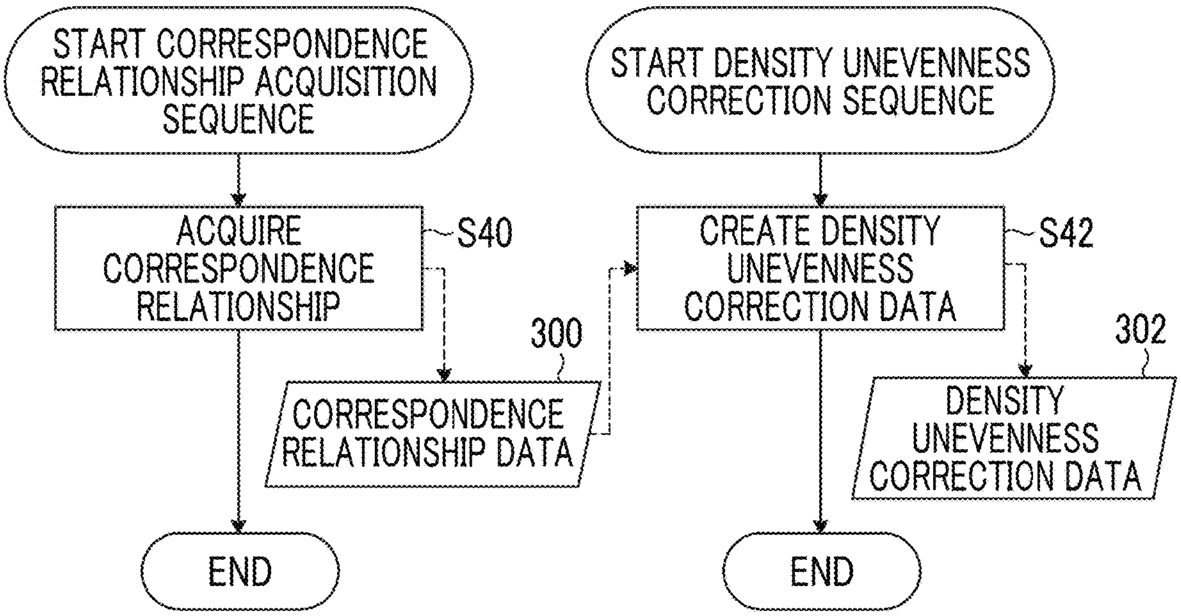
FIG. 13 is a flowchart showing a procedure in a case in which a correspondence relationship acquisition sequence is introduced separately from a density unevenness correction sequence.

FIG. 13 is a flowchart showing a procedure in a case in which the correspondence relationship acquisition sequence is introduced separately from the density unevenness correction sequence. As shown in FIG. 13, in the correspondence relationship acquisition sequence, the correspondence relationship acquisition step S40 is executed, the correspondence relationship data 300 is acquired, the correspondence relationship data 300 is stored, and the correspondence relationship acquisition sequence is terminated.

In addition, in the density unevenness correction data creation sequence, the density unevenness correction data creation step S42 is executed in advance by using the correspondence relationship data 300 acquired in the correspondence relationship acquisition sequence, the density unevenness correction data 302 is created, the density unevenness correction data 302 is stored, and the density unevenness correction data creation sequence is terminated. It should be noted that the sequence shown in FIG. 13 is an example of a second sequence.

Figure 14:
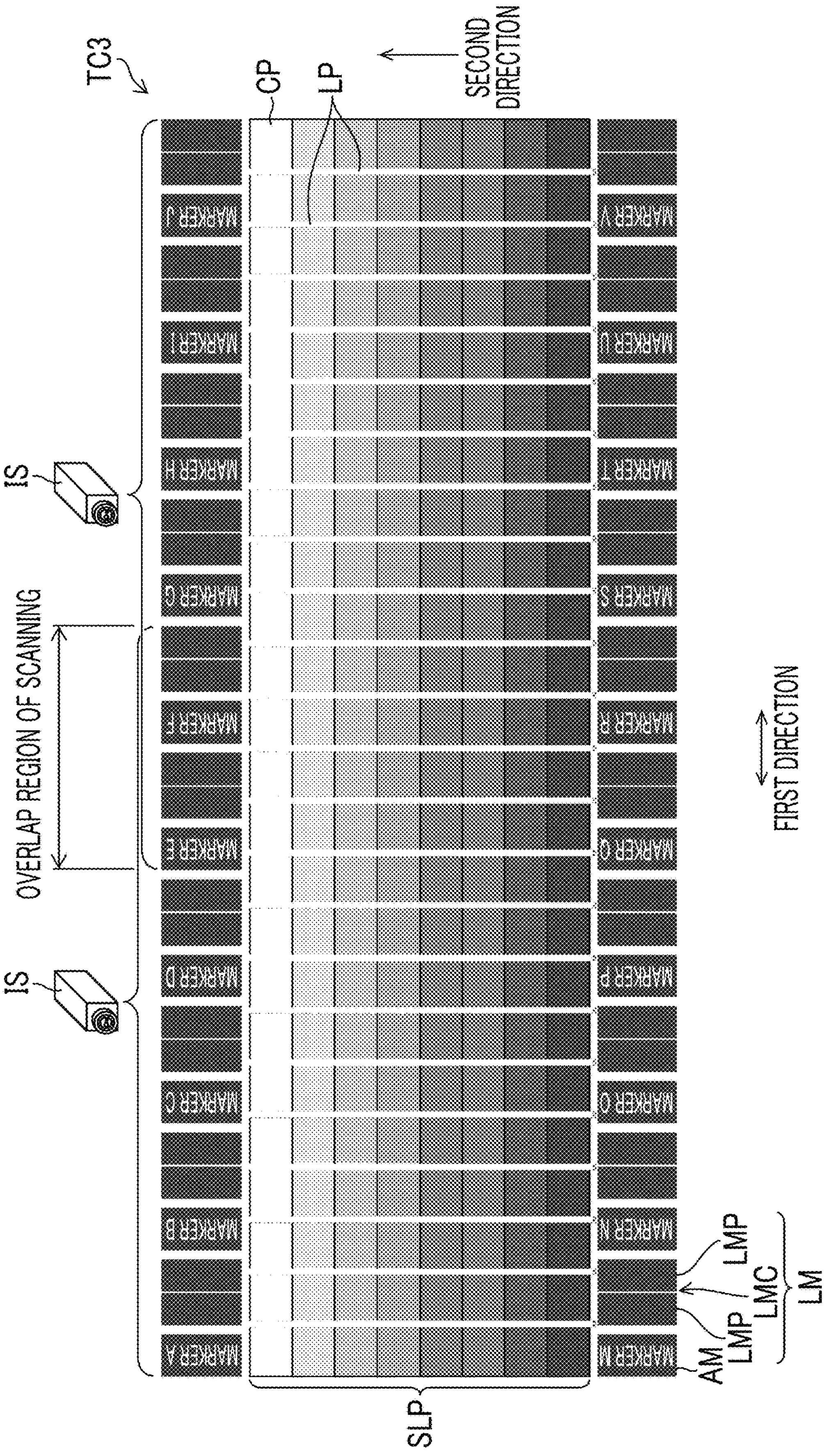
FIG. 14 is a schematic diagram of the test chart applied to the correspondence relationship acquisition sequence shown in FIG. 13.

Acquisition of Correspondence Relationship in First Direction in Correspondence Relationship Acquisition Sequence FIG. 14 is a schematic diagram of the test chart applied to the correspondence relationship acquisition sequence shown in FIG. 13. In the correspondence relationship acquisition sequence shown in FIG. 13, a test chart TC3 including a step line patch SLP shown in FIG. 14 is applied.

That is, the test chart TC3 shown in FIG. 14 includes the step line patch SLP instead of the density step pattern SP of the test chart TC1 shown in FIG. 1. In the step line patch SLP, a line pattern LP is inserted into the density step pattern SP shown in FIG. 1.

In the correspondence relationship acquisition sequence shown in FIG. 13, the information on the detailed correspondence relationship in the first direction is acquired from information on a step line patch portion in the scan image corresponding to the step line patch SLP shown in FIG. 14. The information on the detailed correspondence relationship in the first direction is the correspondence relationship between the theoretical position and the scan position obtained at a density position similar to that of the density unevenness correction data creation sequence, and the information on the detailed correspondence relationship in the first direction can be applied to calculate the theoretical position from the scan position for the first direction in the density unevenness correction data creation sequence.

That is, in a case in which the information on the detailed correspondence relationship in the first direction is acquired, the information on the step line patch portion is used instead of the information on the line mark portion. As a result, the problem 3 described above can be solved.

FIG. 14 shows, as an example, the line pattern LP to which the zero density value is applied. As for the density of the line pattern LP, each density pattern CP and the line pattern LP need only be distinguishable from each other. It is preferable to adopt an aspect of comprising a user interface that sets the density value of the line pattern LP.

Width of Line Pattern in Step Line Patch

It is preferable that a width of the line pattern LP in the step line patch SLP can be freely adjusted as appropriate according to the step density. The width of the line pattern LP extending in the first direction is a length of the line pattern LP in the second direction. For example, in a combination of the ink and the print medium in which the bleeding is relatively large, in a case in which the width of the line pattern LP is relatively small, there is a concern that the line pattern LP disappears due to the bleeding. In addition, a degree of bleeding can fluctuate according to the step density. It should be noted that the test chart TC3 shown in FIG. 14 is an example of a second test chart.

Correction of Deviation between Sequences

A timing at which the density unevenness correction sequence, in which the correspondence relationship acquisition sequence is introduced separately from the density unevenness correction data creation sequence, is executed is different from a timing at which the correspondence relationship acquisition sequence is executed, and a deviation due to some conditional difference can occur. For example, an ambient environment, such as an ambient temperature of the image sensor IS, is changed between the density unevenness correction data creation sequence and the correspondence relationship acquisition sequence, the resolution of the image sensor IS slightly fluctuates, and as a result, the deviation between the scan images can occur.

In addition, between the density unevenness correction data creation sequence and the correspondence relationship acquisition sequence, due to some causes, a positional relationship between the ink jet head and the image sensor IS mechanically fluctuates, and as a result, the deviation between the scan images can occur.

For the purpose of improving the robustness against the deviation, it is preferable to correct the deviation between the density unevenness correction sequence and the correspondence relationship acquisition sequence. Image information common to each sequence can be used to correct the deviation between the respective sequences. For example, the line mark LM shown in FIG. 14 is the information common to each sequence. Therefore, the detailed correspondence relationship in the first direction is used, which is acquired by using the step line patch SLP after adding enlargement processing information, reduction processing information, and parallel movement processing information in the first direction such that the difference in the positional information of the line mark LM in each sequence. As a result, the robustness against the deviation between the sequences can be improved.

Further, an edge of the step line patch SLP in the first direction is the information common to each sequence. Therefore, the detailed correspondence relationship in the first direction is used, which is acquired by using the step line patch SLP after adding enlargement processing information, reduction processing information, and parallel movement processing information in the first direction such that the difference in the positional information of the edge in the first direction of the step line patch SLP in each sequence. As a result, the robustness against the deviation between the sequences can be improved.

In Case In Which Plurality of Image Sensors Are Provided

In a case in which the plurality of image sensors IS are provided, the deviation between the sequences is further complicated. For example, the ambient environment, such as the ambient temperature of at least one of the plurality of image sensors IS, is changed between the density unevenness correction data creation sequence and the correspondence relationship acquisition sequence, the resolution of the image sensor IS slightly fluctuates, and as a result, the deviation between the scan images can occur. Then, an overlap amount of an overlap region of the plurality of image sensors IS can fluctuate.

In a case in which the overlap amount of the overlap region of the plurality of image sensors IS fluctuates, the correction using the information common to each sequence present in the overlap region is effective. For example, the detailed correspondence relationship in the first direction is used, which is acquired by using the step line patch SLP after disposing one or more line marks LM in the overlap region and further adding the change amount of the overlap amount between the sequences. As a result, the robustness against the deviation between the sequences can be improved.

As many line marks LM as possible are disposed in the overlap region, and the change amount of the overlap amount is statistically obtained from the positions of the plurality of line marks LM. As a result, the change amount of the overlap amount can be obtained with higher accuracy. Examples of the statistical index value include an arithmetic average value and a median value. It should be noted that the step of acquiring the detailed correspondence relationship in the first direction by using the step line patch SLP after further adding the change amount of the overlap amount described in the embodiment is an example of an overlap region correction step.

Preparation of Plurality of Modes

A mode in which the density unevenness correction data creation sequence shown in FIG. 12 is used is defined as a first mode, and a mode in which the density unevenness correction data creation sequence shown in FIG. 13 is used is defined as a second mode. Since the correspondence relationship acquisition step S40 is executed in the density unevenness correction data creation sequence, the first mode has an advantage that it is not required to separately execute the correspondence relationship acquisition sequence, and it is possible to simply execute the creation of the density unevenness correction data. On the other hand, the first mode has a disadvantage that the robustness against the difference in the paper deformation of each step density is relatively low.

The second mode has an advantage that the robustness against the difference in the paper deformation of each step density is relatively high. On the other hand, there is a disadvantage that it is required to execute the correspondence relationship acquisition sequence in advance separately from the density unevenness correction data creation sequence, and it is difficult to simply execute the creation of the density unevenness correction data.

Therefore, in a case in which a density unevenness correction data creation function is incorporated into the printing system, it is preferable to adopt an aspect in which the first mode and the second mode are prepared, and the first mode and the second mode are selectively switched as required.

Figure 15:
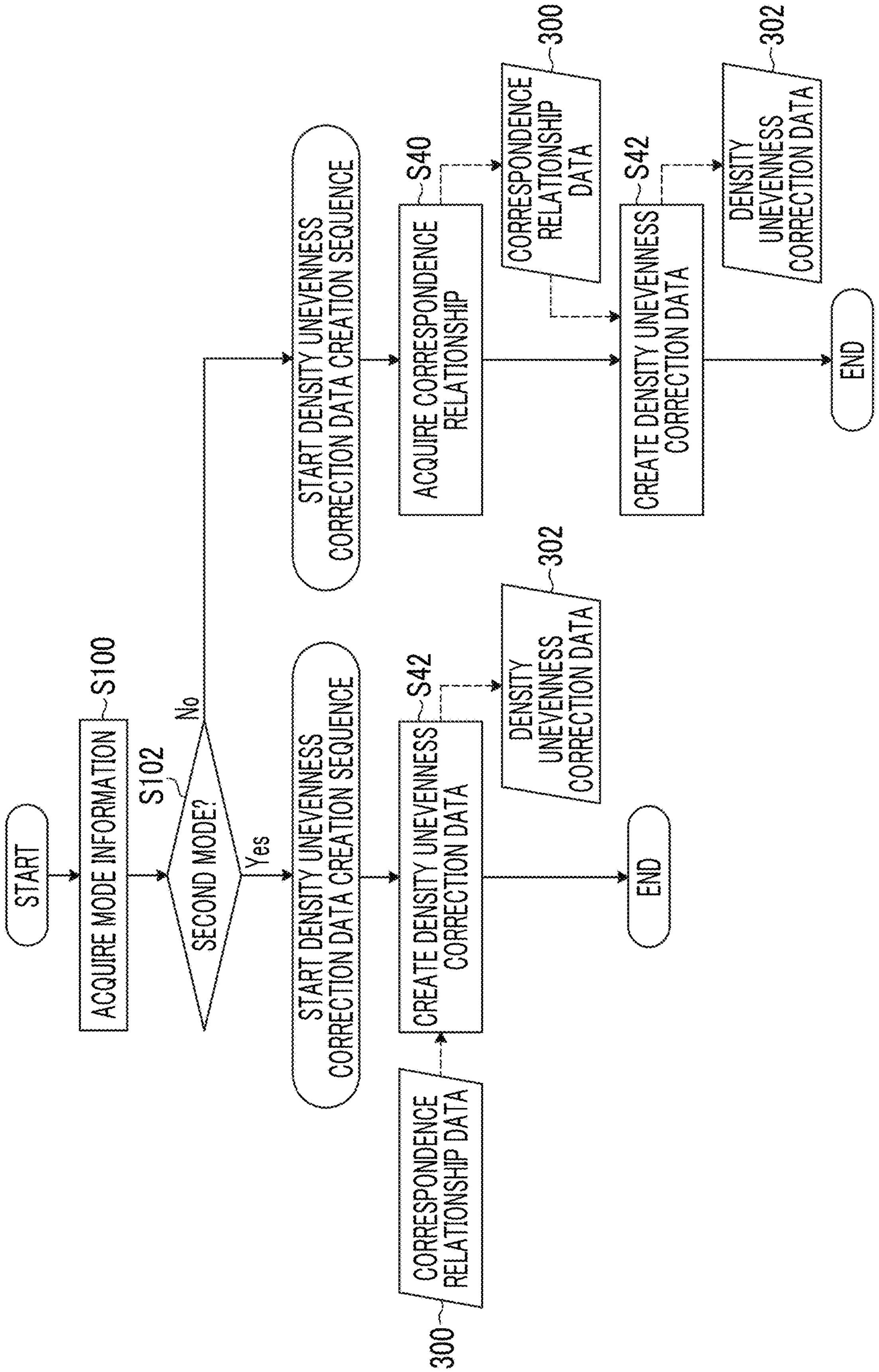
FIG. 15 is a flowchart showing a procedure of the density unevenness correction data creation method in a case in which a plurality of modes are provided.

FIG. 15 is a flowchart showing a procedure of the density unevenness correction data creation method in a case in which the plurality of modes are provided. In a mode information acquisition step S100, mode information in the density unevenness correction data creation is acquired. In the mode information acquisition step S100, the mode information input by the operator can be acquired by using the input device 120 shown in FIG. 7.

In the mode information acquisition step S100, the mode information according to the printing condition, such as a type of printing paper and a type of ink, may be automatically acquired, or the mode information according to an environmental condition, such as an environmental temperature, may be automatically acquired. In the mode information acquisition step S100, in a case in which the mode information is acquired, the processing proceeds to a mode determination step S102.

In the mode determination step S102, a determination is made as to whether the mode information acquired in the mode information acquisition step S100 represents the first mode or the second mode. In the mode determination step S102, in a case in which the mode information representing the first mode is acquired, a No determination is made. In a case in which the No determination is made, the density unevenness correction data creation sequence shown in FIG. 12 is executed, and the density unevenness correction data 302 is created and stored.

On the other hand, in the mode determination step S102, in a case in which the mode information representing the second mode is acquired, a Yes determination is made. In a case in which the Yes determination is made, the correspondence relationship acquisition sequence shown in FIG. 13 is executed, and the correspondence relationship data 300 is acquired and stored.

In the second mode, the density unevenness correction data creation sequence shown in FIG. 13 is executed by using the correspondence relationship data 300 acquired in the correspondence relationship acquisition sequence executed in advance, and the density unevenness correction data 302 is created and stored. It should be noted that the mode determination step S102 described in the embodiment can include a mode switching step of selectively switching between the first mode and the second mode.

Actions and Effects of Second Embodiment

The density unevenness correction data creation method and the density unevenness correction data creation apparatus according to the second embodiment can obtain the following actions and effects.

[1] In the correspondence relationship acquisition sequence, the line pattern LP extending in the first direction is added to the density step pattern, and the correspondence relationship data 300 including the detailed correspondence relationship is created based on the center position of the line pattern portion, and is stored. As a result, the detailed correspondence relationship having high robustness against the shrinkage of the print medium is acquired.

[2] The correspondence relationship acquisition sequence is executed in advance separately from the density unevenness correction data creation sequence, and the correspondence relationship data 300 is acquired. In the density unevenness correction data creation sequence, the density unevenness correction data is created by using the correspondence relationship data 300 acquired in advance. As a result, it is possible to simply execute the density unevenness correction data creation sequence.

[3] The first mode in which the correspondence relationship acquisition sequence is included in the density unevenness correction data creation sequence, and the second mode in which the density unevenness correction data is created by using the correspondence relationship data 300 acquired in advance are selectively switched. As a result, it is possible to handle a case in which the shrinkage of the print medium is relatively large. In addition, in a case in which the shrinkage of the print medium is relatively small, the density unevenness correction data creation sequence is simply executed.

[4] In the second mode, the common information between the sequences of the correspondence relationship acquisition sequence and the density unevenness correction data creation sequence is used to correct the deviation of the correspondence relationship between the sequences. As the common information between the sequences, information on the edge in the first direction of the density step pattern SP and the information on the line mark LM are used. As a result, even in a case in which the shrinkage of the print medium is relatively large, the density unevenness correction data is created with high accuracy.

[5] In a case in which the plurality of image sensors IS are provided in the second mode, the deviation of the overlap region of the imaging regions of the plurality of image sensors IS is corrected by using the information on the line mark portion. As a result, even in a case in which the shrinkage of the print medium is relatively large, the density unevenness correction data is created with high accuracy.

Modification Example of Test Chart

Figure 16:
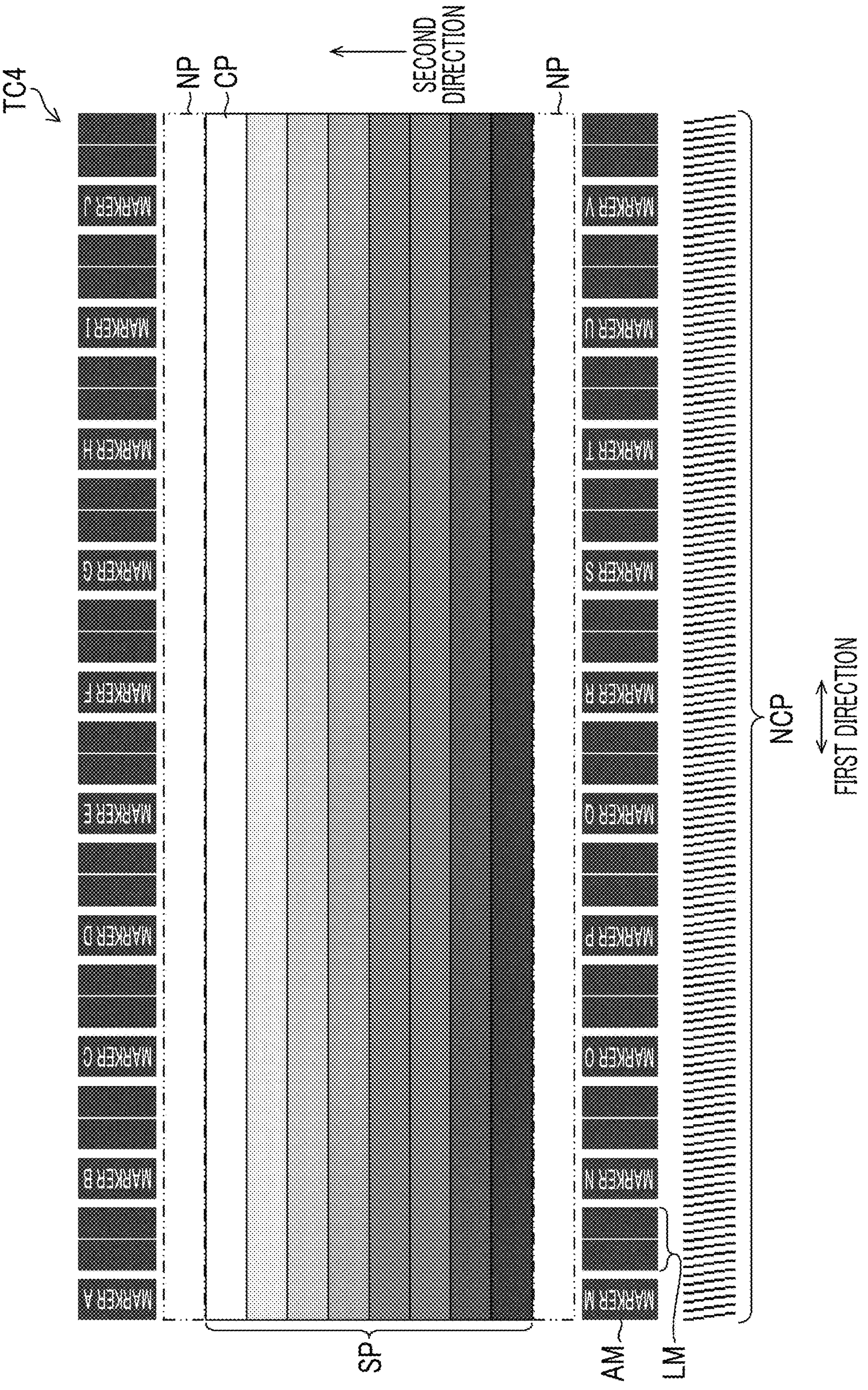
FIG. 16 is a schematic diagram of a test chart according to a modification example.

FIG. 16 is a schematic diagram of a test chart according to the modification example. In a test chart TC4 shown in FIG. 16, a defective nozzle detection pattern NCP is added to the test chart TC2 shown in FIG. 5. It should be noted that FIG. 16 shows, as an example, the test chart TC4 in which the defective nozzle detection pattern NCP is added to the test chart TC2 shown in FIG. 5. However, the test chart TC4 according to the modification example may have an aspect in which the defective nozzle detection pattern NCP is added to the test chart TC1 shown in FIG. 2, or may have an aspect in which the defective nozzle detection pattern NCP is added to the test chart TC1 shown in FIG. 14.

FIG. 16 shows, as an example of the defective nozzle detection pattern NCP, a ladder pattern including a plurality of lines extending in the second direction drawn by using each nozzle provided in the ink jet head. The ladder pattern may be an inversion pattern in which the line shown in FIG. 16 and the background are inverted.

That is, a determination need only be made as to whether the defective nozzle detection pattern NCP is normal or abnormal for each nozzle based on analysis information of the defective nozzle detection pattern NCP. For example, the defective nozzle detection pattern NCP may be imaged by using an imaging device, and the imaging data may be analyzed to determine whether each nozzle is normal or abnormal.

The defective nozzle detection pattern NCP shown in FIG. 16 is disposed at one end portion of the print medium in the second direction. The defective nozzle detection pattern NCP may be disposed at the other end portion of the print medium in the second direction, or may be disposed between the alignment mark AM and the line mark LM and the density step pattern SP for the second direction, and can be disposed at any position.

The defective nozzle detection pattern NCP may be disposed at a plurality of positions of the print medium. For example, the defective nozzle detection pattern NCP may be disposed at one end portion and the other end portion of the print medium in the second direction. In a case in which a plurality of defective nozzle detection patterns NCP are formed, the analysis results of the plurality of defective nozzle detection patterns NCP may be comprehensively determined to determine whether each nozzle is normal or abnormal.

In the analysis processing of the defective nozzle detection pattern NCP, analysis target data of the defective nozzle detection pattern NCP is cut out by using the rough correspondence relationship based on the alignment mark AM, and the cut out analysis target data is input to an analysis processing unit of the defective nozzle detection pattern NCP. The defective nozzle detection pattern NCP may be cut out of the analysis target data by using the detailed correspondence relationship based on the line mark LM.

The defective nozzle that is determined to be abnormal is intentionally subjected to mask processing. Non-jetting correction processing is executed in which the printing is executed with respect to the print position of the defective nozzle by using the normal nozzle in the vicinity of the defective nozzle. It should be noted that the defective nozzle detection pattern NCP described in the embodiment is an example of an abnormal recording element detection pattern.

Here, the defective nozzle is a nozzle in which a dropping position and a dropping size exceed a normal range, such as a nozzle in which jetting is impossible and a nozzle that has a greatly bent jetting direction. The defective nozzle can be referred to as a non-jetting nozzle, a non-ejection nozzle, an abnormal nozzle, and the like.

Application Example of Ink Jet Printing System

Application examples of the density unevenness correction data creation method and the density unevenness correction data creation apparatus to the ink jet printing system will be described.

Overall Configuration of Ink Jet Printing System

Figure 17:
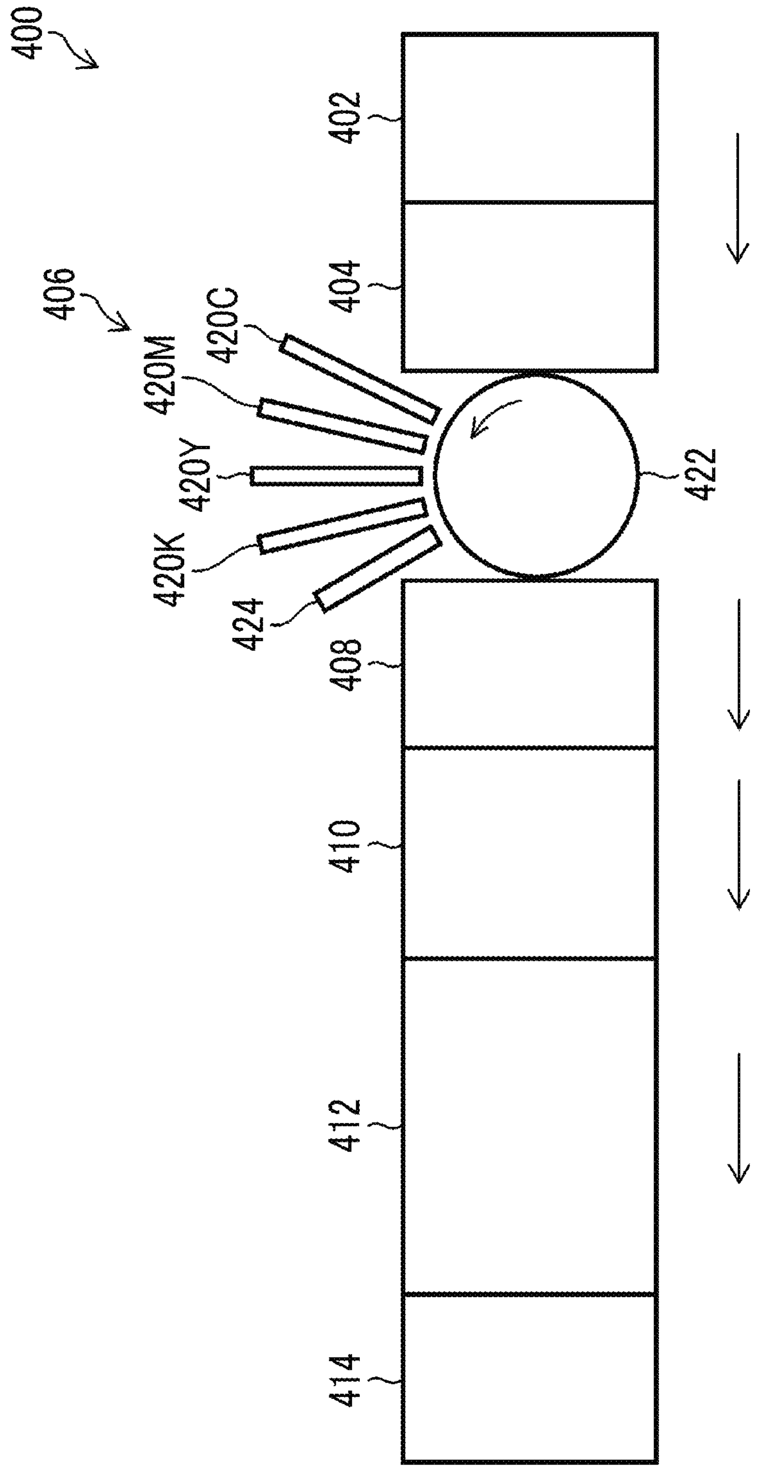
FIG. 17 is an overall configuration diagram of an ink jet printing system according to the embodiment.

FIG. 17 is an overall configuration diagram of the ink jet printing system according to the embodiment. An ink jet printing system 400 shown in FIG. 17 is provided with a printing device 406 of a digital method that prints a color image on the print medium by applying the printing of the single-pass method.

A paper medium, such as flat sheet paper or continuous paper, can be applied to the print medium. The print medium may have a structure in which fibers, such as cloth, are woven. Roll paper rolled in a roll shape may be applied to the print medium. The print medium can be referred to as a printing paper, a print paper, and the like.

The ink jet printing system 400 comprises a print medium supply device 402, a first intermediate transport device 404, a printing device 406, a second intermediate transport device 408, an inspection device 410, a drying device 412, and an accumulation device 414. Hereinafter, the respective units will be described in detail.

Print Medium Supply Device

In a case in which the print medium is in a continuous form, the print medium supply device 402 comprises a roll accommodation portion that accommodates a roll around which the print medium is wound. In a case in which the print medium is in a flat sheet form, the print medium supply device 402 comprises a tray that accommodates the print medium. The print medium supply device 402 supplies the print medium to the first intermediate transport device 404 in correspondence with printing control of the printing device 406. The print medium supply device 402 can comprise a correction mechanism that corrects a posture of the print medium.

First Intermediate Transport Device

The first intermediate transport device 404 passes the print medium supplied from the print medium supply device 402 to the printing device 406. A known configuration can be applied to the first intermediate transport device 404 according to the form of the print medium. It should be noted that an arrow line from the print medium supply device 402 toward the first intermediate transport device 404 represents a medium transport direction which is a transport direction of the print medium.

Printing Device

The printing device 406 comprises an ink jet head 420C, an ink jet head 420M, an ink jet head 420Y, and an ink jet head 420K. The ink jet head 420C, the ink jet head 420M, the ink jet head 420Y, and the ink jet head 420K are disposed in the order described above from an upstream side along the medium transport direction.

The ink jet head 420C jets cyan ink. The ink jet head 420M jets magenta ink. The ink jet head 420Y jets yellow ink. The ink jet head 420K jets black ink.

A line head in which the plurality of nozzles are disposed over a length equal to or longer than the total length of the print medium for a medium width direction, which is orthogonal to the medium transport direction and is parallel to the print surface for the print medium can be applied to the ink jet head 420C and the like. As configuration example of the line head, there is a configuration in which a plurality of head modules are connected to each other. A two-dimensional disposition, such as a matrix disposition, is applied to the plurality of nozzles provided in the ink jet head 420C and the like.

In the ink jet head 420C and the like, a piezoelectric jetting method comprising a piezoelectric element as a jetting pressure element that generates a jetting pressure can be applied. For the ink jet head 420C and the like, a thermal method of jetting the ink by using a film boiling phenomenon of the ink can be applied.

The printing device 406 forms the color image on the print medium by using color ink, such as the cyan ink. The printing device 406 may comprise an ink jet head that jets special color ink other than process ink, such as the cyan ink, such as an ink jet head that forms a white image as a background image of a color image by using white ink.

The printing device 406 comprises a printing drum 422. The printing drum 422 has a cylindrical shape, and is supported to be rotatable with a central axis as a rotation axis. The printing drum 422 comprises a print medium support region that supports the print medium on a peripheral surface thereof.

The ink jet head 420C and the like are disposed at a position at which a nozzle surface faces the peripheral surface of the printing drum 422, and a posture in which a normal line of the printing drum 422 and a normal line of the nozzle surface are parallel is applied.

The rotation axis of the printing drum 422 is connected to a motor (not shown) via a drive mechanism (not shown). In a case in which the motor is rotated, the printing drum 422 is rotated in a direction indicated by an arrow line. In a case in which the printing drum 422 is rotated, the print medium supported on the peripheral surface of the printing drum 422 is transported along the rotation direction of the printing drum 422.

A plurality of suction holes are formed in the print medium support region of the peripheral surface of the printing drum 422. The plurality of suction holes are disposed based on a prescribed pattern. The plurality of suction holes communicate with a suction flow passage (not shown). The suction flow passage is connected to a suction pump (not shown). The print medium is suction-supported on the peripheral surface of the printing drum 422 by operating the suction pump and by using a negative pressure generated in the plurality of suction holes.

A transport form of the print medium in the printing device 406 is not limited to a transport form using the printing drum 422. For example, a transport form using a transport belt, a transport form using a plurality of rollers, and the like can be applied.

The printing device 406 comprises an in-line sensor 424. The in-line sensor 424 shown in FIG. 17 can be applied to the image sensor IS shown in FIG. 1 and the like. The in-line sensor 424 is disposed at a position on a downstream side of the ink jet head 420K in the medium transport direction. The in-line sensor 424 reads the test chart printed on the print medium and outputs a read signal of the test chart. The printing device 406 detects an abnormality of the nozzle provided in the ink jet head 420C and the like based on the read signal of the test chart.

The in-line sensor 424 comprises an image sensor that captures an image to be printed on the print medium. A CCD image sensor, a CMOS image sensor, and the like can be applied to the image sensor. The in-line sensor 424 has an imaging region corresponding to the entire width of the print medium in the medium width direction. The in-line sensor 424 may be provided with an optical member, such as a condenser lens. It should be noted that CCD is an abbreviation for a charge coupled device. CMOS is an abbreviation for a complementary metal oxide semiconductor.

Second Intermediate Transport Device

The second intermediate transport device 408 passes the print medium passed from the printing drum 422 to the inspection device 410. The same configuration as configuration of the first intermediate transport device 404 can be applied to the second intermediate transport device 408. It should be noted that an arrow line shown in the second intermediate transport device 408 represents the medium transport direction of the second intermediate transport device 408.

Inspection Device

The inspection device 410 comprises an imaging device that captures the print image printed on the print medium. The inspection device 410 outputs the scan image of the print image. The inspection device 410 can detect a defect in the print image based on the scan image of the print image. It should be noted that an arrow line shown in the inspection device 410 represents the medium transport direction of the inspection device 410.

Drying Device

The drying device 412 executes drying processing with respect to the print medium on which the print image has been printed. The drying device 412 comprises a heater and a fan, and a configuration in which hot air is blown onto the print medium in which the printing has been executed can be applied. The drying device 412 comprises a drying transport unit that transports the print medium. As a transport form of the print medium applied to the drying transport unit, a known transport form, such as drum transport, belt transport, and roller transport, can be applied. It should be noted that an arrow line shown in the drying device 412 represents the medium transport direction of the drying device 412.

Accumulation Device

The accumulation device 414 accommodates the print medium passed from the drying device 412. In a case in which the print medium is in the continuous form, the accumulation device 414 comprises a roll accommodation portion that accommodates a roll around which the print medium is wound. In a case in which the print medium is in the flat sheet form, the accumulation device 414 comprises a tray that accommodates the print medium.

A two-liquid method in which a treatment liquid that aggregates or insolubilizes a coloring material contained in the ink is used may be applied to the ink jet printing system 400. That is, the ink jet printing system 400 can adopt an aspect of comprising a treatment liquid applying device that applies the treatment liquid to the print medium before the printing, in which the treatment liquid applying device is disposed at a position on the upstream side of the printing device 406 in the medium transport direction.

In the aspect of comprising the treatment liquid applying device, a treatment liquid drying device that dries the treatment liquid applied to the print medium may be provided. The treatment liquid drying device is disposed at a position on the downstream side of the treatment liquid applying device in the medium transport direction, which is a position on the upstream side of the printing device 406 in the medium transport direction.

Configuration Example of Ink Jet Head

Figure 18:
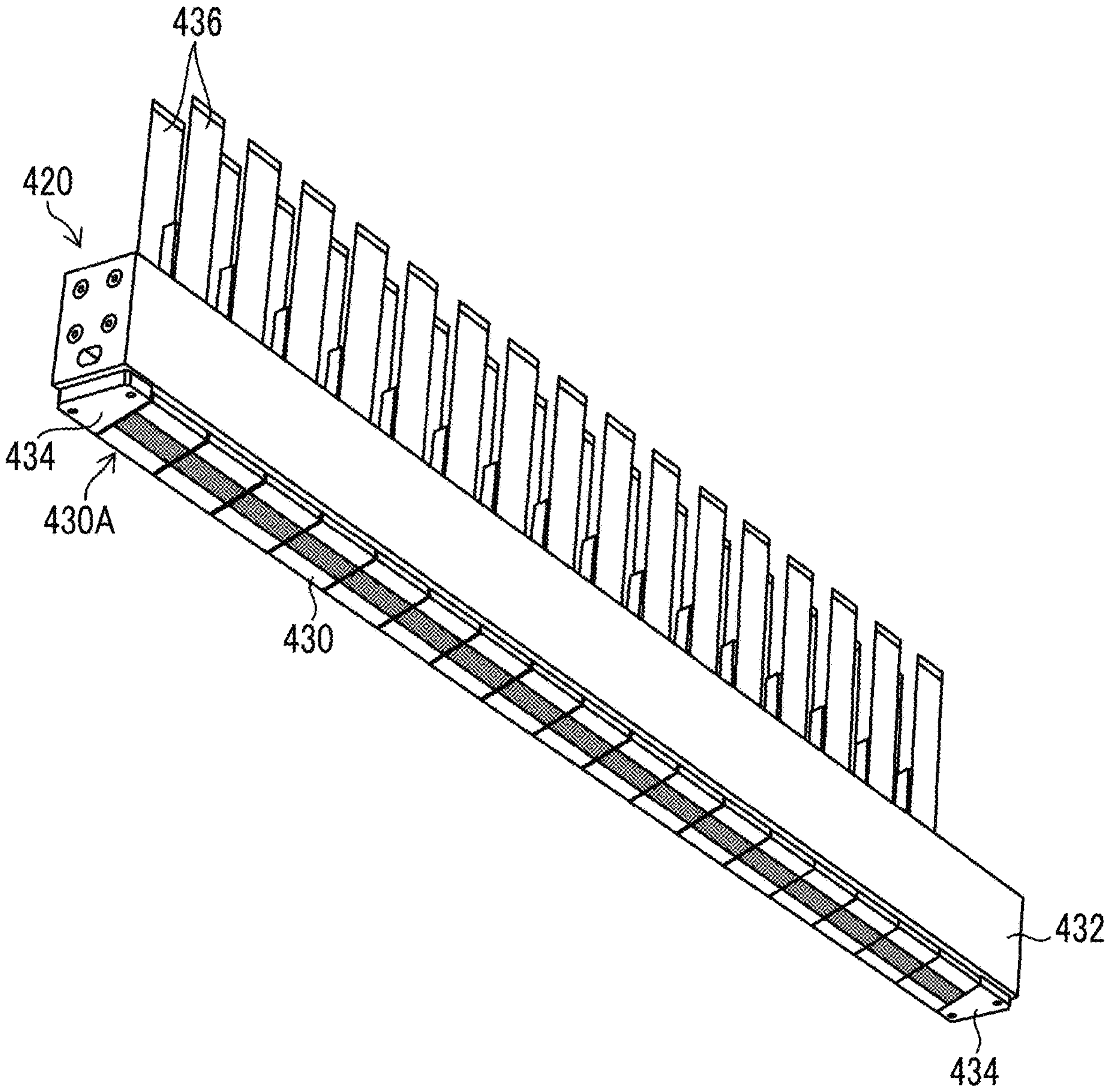
FIG. 18 is a perspective view showing a configuration example of an ink jet head shown in FIG. 17.

FIG. 18 is a perspective view showing a configuration example of the ink jet head shown in FIG. 17. The same configuration can be applied to the ink jet head 420C, the ink jet head 420M, the ink jet head 420Y, and the ink jet head 420K shown in FIG. 17. Here, the ink jet head 420C and the like are collectively referred to as an ink jet head 420.

The ink jet head 420 has a structure in which a plurality of head modules 430 are connected in a line along a longitudinal direction of the ink jet head 420. The plurality of head modules 430 are integrated and supported by using a head frame 432.

The ink jet head 420 is the line head in which the plurality of nozzles are disposed along the length corresponding to the entire width of the print medium in the medium width direction. It should be noted that the nozzle is not shown in FIG. 17. The nozzle is shown with a reference numeral 442 in FIG. 18.

A plan shape of a nozzle surface 430A of the head module 430 is a parallel quadrilateral. Both ends of the head frame 432 are attached with dummy plates 434. The plan shape of the nozzle surface 430A of the ink jet head 420 is a rectangular shape as an entirety in which the head module 430 and the dummy plate 434 are combined.

The head module 430 is attached with a flexible substrate 436. The flexible substrate 436 is a wiring member that delivers a driving voltage supplied to the head module 430. One end of the flexible substrate 436 is electrically connected to the head module 430, and the other end thereof is electrically connected to a driving voltage supply circuit. It should be noted that the driving voltage supply circuit is not shown.

Each of the plurality of head modules 430 provided in the ink jet head 420 can be associated with a module number representing a position of the head module 430 in the order from the head module 430 disposed at one end of the ink jet head 420.

Figure 19:
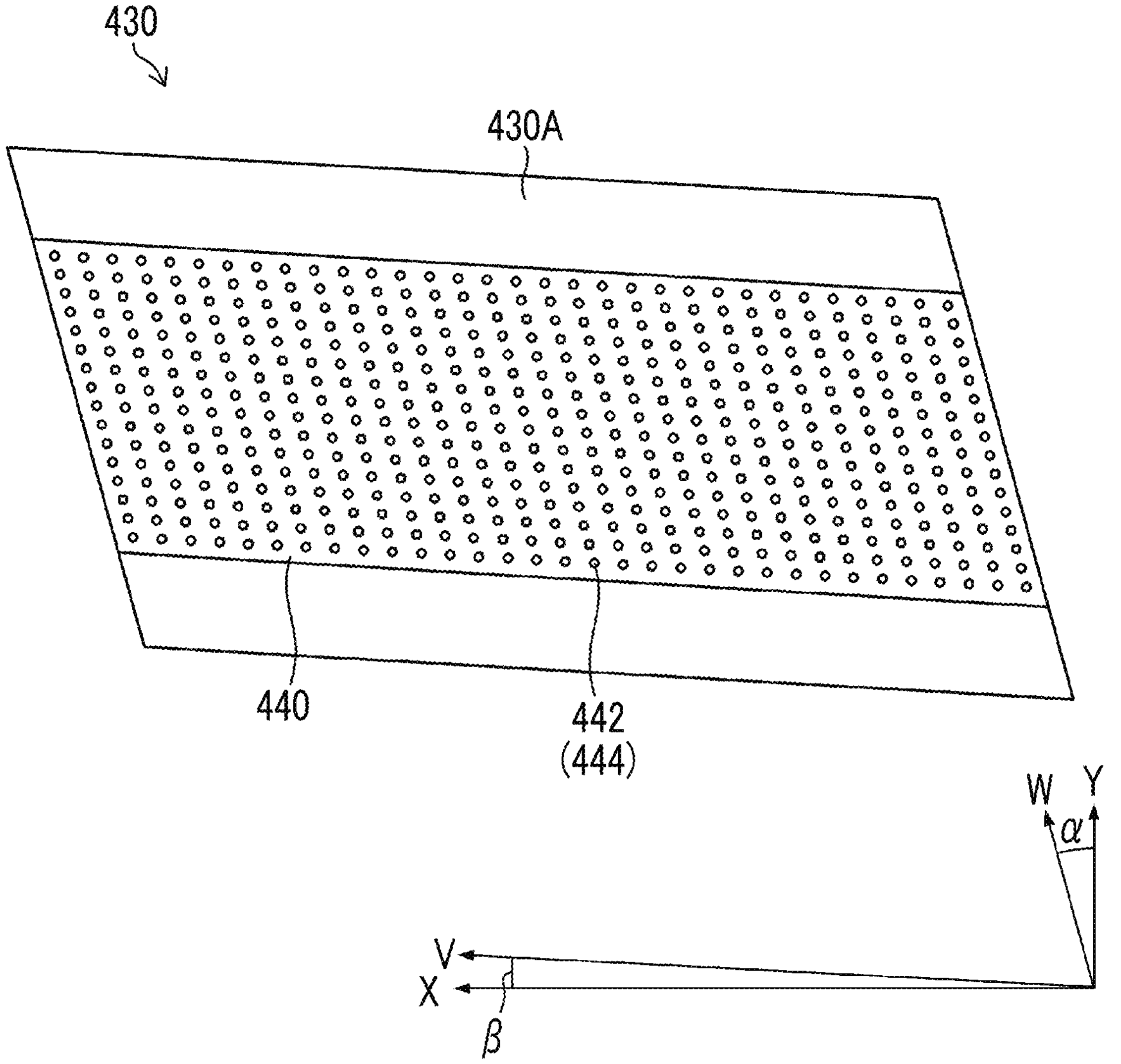
FIG. 19 is a plan view showing a nozzle disposition example of the ink jet head shown in FIG. 18.

FIG. 19 is a plan view showing an example of a nozzle disposition of the ink jet head shown in FIG. 18. A central portion of the nozzle surface 430A of the head module 430 comprises a nozzle disposition portion 440 having a strip shape. The nozzle disposition portion 440 functions as the substantial nozzle surface 430A.

A plurality of nozzles 442 are disposed in the nozzle disposition portion 440. The nozzle 442 includes a nozzle opening 444 formed in the nozzle surface 430A. A structure example of the nozzle 442 will be described below. In the following description, the disposition of the nozzles 442 may also be read as the disposition of the nozzle openings 444.

The head module 430 shown in FIG. 19 has a plane shape that is a parallel quadrilateral having an end surface on a long side along a V direction having an inclination of an angle β with respect to the medium width direction shown by a reference numeral X and an end surface on a short side along a W direction having an inclination of an angle α with respect to the medium transport direction shown by a reference numeral Y.

In the head module 430, the plurality of nozzles 442 are disposed in a matrix in a row direction along the V direction and a column direction along the W direction. The nozzles 442 may be disposed along the row direction along the medium width direction and the column direction diagonally intersecting the medium width direction.

In a case of the ink jet head 420 in which the plurality of nozzles 442 are disposed in a matrix, a projection nozzle line in which each nozzle 442 in the matrix disposition is projected along the nozzle line direction can be considered to be equivalent to one nozzle line in which the respective nozzles 442 are disposed at substantially equal intervals at a density that achieves the maximum recording resolution for the nozzle line direction. The projection nozzle line is a nozzle line in which each nozzle 442 in the matrix disposition is orthographically projected along the nozzle line direction.

The substantially equal intervals mean that the dropping points that can be recorded in the printing device are substantially equal intervals. For example, a case in which the intervals are slightly different in consideration of at least any one of a manufacturing error or movement of liquid droplets on the print medium due to the impact interference is also included in the concept of the equal interval. The projection nozzle line corresponds to a substantial nozzle line. In consideration of the projection nozzle line, each nozzle 442 can be associated with a nozzle number representing a nozzle position in the order of disposition of the projection nozzles arranged along the nozzle line direction. That is, the substantial disposition direction of the plurality of nozzles 442 is grasped as the medium width direction.

It should be noted that, although FIG. 19 shows, as an example, the ink jet head 420 in which the plurality of nozzles 442 are disposed in a matrix, one-line disposition may be applied to the plurality of nozzles 442, or zigzag disposition in two lines may be applied to the plurality of nozzles 442.

The substantial density of the nozzles 442 in the medium width direction corresponds to the print resolution in the medium width direction. Examples of the print resolution in the medium width direction include 1200 dots per inch. Inch for each dot representing the number of dots per inch can be referred to as dpi by using an abbreviation for dot per inch.

Electric Configuration of Ink Jet Printing System

Figure 20:
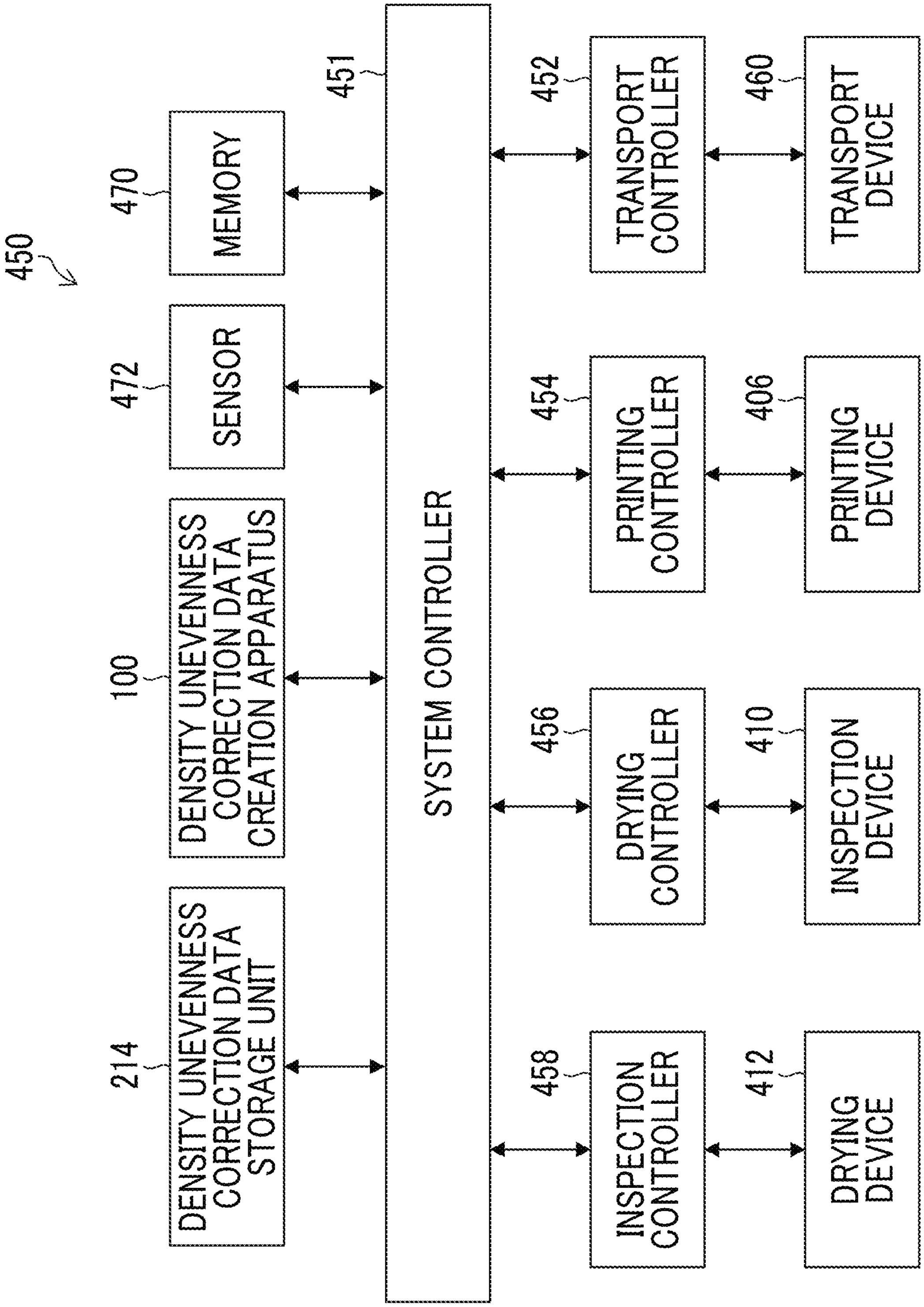
FIG. 20 is a functional block diagram showing an electric configuration of the ink jet printing system shown in FIG. 17.

FIG. 20 is a functional block diagram showing an electric configuration of the ink jet printing system shown in FIG. 17. The ink jet printing system 400 shown in FIG. 17 comprises a control device 450 shown in FIG. 20. A computer comprising a processor is applied to the control device 450.

The control device 450 executes various programs to execute operation control of each unit of the ink jet printing system 400. The control device 450 comprises a system controller 451, a transport controller 452, a printing controller 454, a drying controller 456, and an inspection controller 458.

The system controller 451 functions as the entire controller that collectively controls various controllers, such as the transport controller 452. The system controller 451 functions as a memory controller that controls reading out of the data and storage of the data to a storage device, such as a memory 470.

The transport controller 452 controls an operation of a transport device 460 based on a command signal transmitted from the system controller 451. That is, the transport controller 452 operates the transport device 460 based on a medium transport condition set in advance to execute transport control of the print medium.

The transport device 460 shown in FIG. 20 includes the first intermediate transport device 404, the second intermediate transport device 408, the printing drum 422, an inspection transport device provided in the inspection device 410, and the drying transport unit provided in the drying device 412, which are shown in FIG. 17. In addition, the print medium supply device 402 and the accumulation device 414 shown in FIG. 17 may be provided in the transport device 460.

The printing controller 454 controls the operation of the printing device 406 based on a command signal transmitted from the system controller 451. That is, the printing controller 454 operates the printing device 406 based on a printing condition set in advance to control the printing on the print medium.

The printing controller 454 comprises an image processing unit. The image processing unit executes color separation processing, color conversion processing, and halftone processing with respect to the print data to generate dot data for the printing. The image processing unit executes various types of correction processing, such as density unevenness correction processing and jetting failure correction processing. In the density unevenness correction processing, the density unevenness correction processing is executed for each nozzle by using the density unevenness correction data that is created by using the density unevenness correction data creation apparatus 100 and that is stored in the density unevenness correction data storage unit 214.

The printing controller 454 comprises a driving voltage generation unit that generates the driving voltage supplied to the ink jet head 420 based on halftone data of each color. The printing controller 454 comprises a driving voltage output unit that outputs the driving voltage supplied to the ink jet head 420. The driving voltage output unit includes an electric power amplification circuit.

The printing controller 454 comprises a jetting controller. The jetting controller generates a jetting control signal in which a jetting timing of each nozzle is prescribed from the dot data generated by using the image processing unit. In addition, the jetting controller generates a driving waveform signal applied to the driving voltage by using the driving waveform data that is generated and stored in advance.

The printing controller 454 comprises a head drive circuit. The head drive circuit uses the driving waveform signal to generate the driving voltage supplied to the piezoelectric element of each nozzle provided in the ink jet head 420. The head drive circuit generates a jetting timing signal for controlling on and off of the piezoelectric element for each nozzle. The head drive circuit supplies the driving voltage to each of the piezoelectric elements for each nozzle at the prescribed jetting timing.

The drying controller 456 controls the operation of the drying device 412 based on a command signal transmitted from the system controller 451. That is, the drying controller 456 operates the drying device 412 based on a drying condition set in advance to control the drying processing with respect to the print medium.

The inspection controller 458 controls the operation of the inspection device 410 based on a command signal transmitted from the system controller 451. That is, the inspection controller 458 controls the inspection of the printed material by operating the inspection device 410 based on an inspection condition set in advance. The inspection controller 458 transmits an inspection result of the printed material to the system controller 451. The system controller 451 transmits the command signal for the operation according to the inspection result of the printed material to various controller, such as the transport controller 452, according to the inspection result of the printed material.

The control device 450 comprises the memory 470. The memory 470 stores the programs, the parameters, and the data used by the control device 450. The system controller 451 reads out and executes various programs stored in the memory 470 to implement various functions of the ink jet printing system 400. The system controller 451 reads out the parameters and the data required for executing various programs from the memory 470.

The system controller 451 acquires various types of detection information from various sensors 472 provided in the ink jet printing system 400. Examples of the various sensors 472 include a temperature sensor and a position detection sensor for the print medium. The system controller 451 transmits a command signal to various controllers according to the acquired information of the various sensor.

Figure 21:
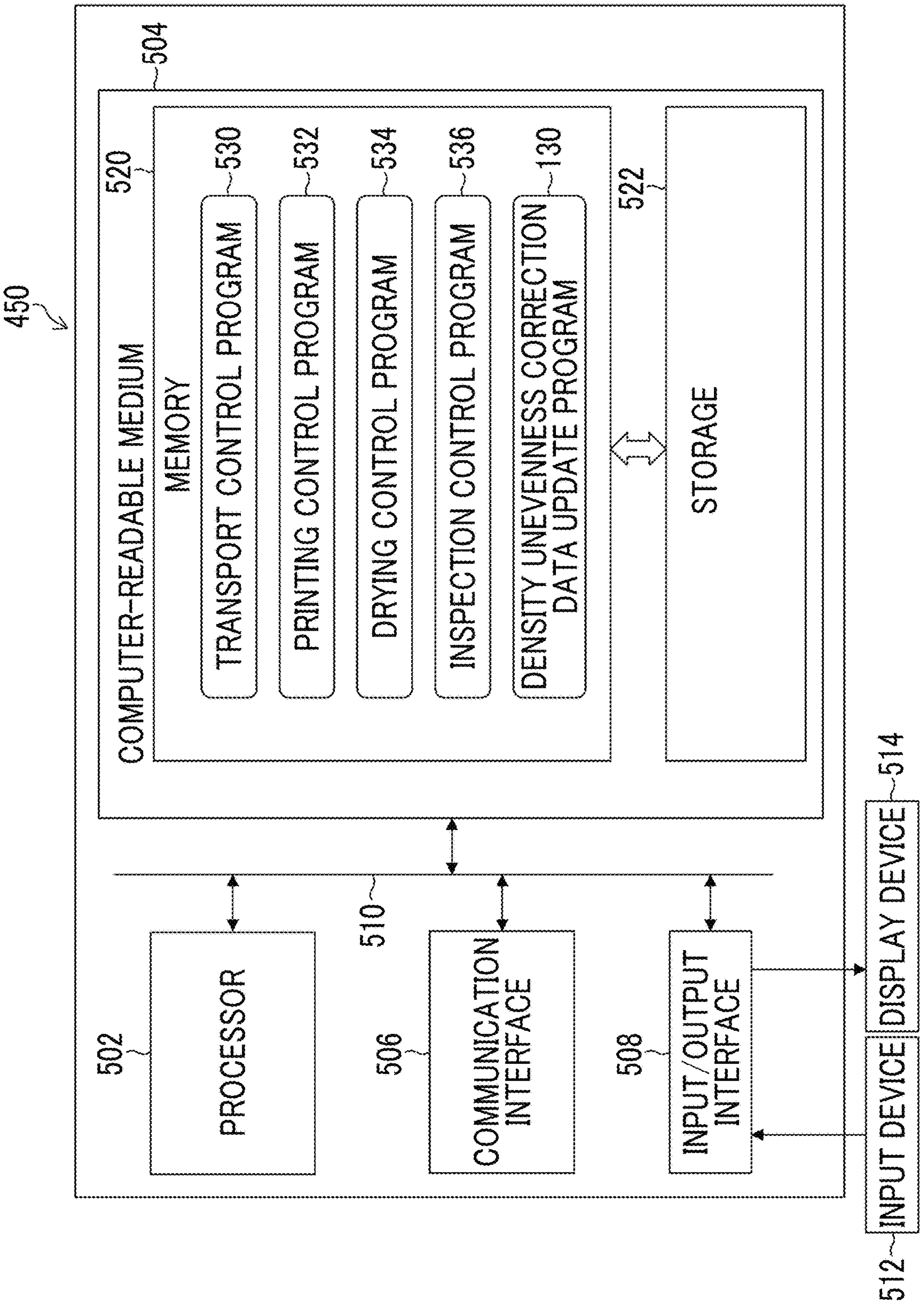
FIG. 21 is a block diagram schematically showing an example of a hardware configuration of the electric configuration shown in FIG. 20.

FIG. 21 is a block diagram schematically showing an example of a hardware configuration of the electric configuration shown in FIG. 20. It should be noted that a processor 502, a communication interface 506, an input/output interface 508, a bus 510, an input device 512, and a display device 514 shown in FIG. 21 are the same configuration elements as the processor 102, the communication interface 106, the input/output interface 108, the bus 110, the input device 120, and the display device 122 shown in FIG. 7, and thus, here, the description thereof is omitted as appropriate.

A computer-readable medium 504 shown in FIG. 21 comprises a memory 520 and a storage 522, similarly to the computer-readable medium 504 shown in FIG. 7. Various programs that implement various functions of the ink jet printing system 400 are stored in the memory 520. In addition, various data and various parameters used in a case in which various programs are executed are stored in the storage 522.

A transport control program 530, a printing control program 532, a drying control program 534, and an inspection control program 536 are stored in the memory 520. The transport control program 530 is applied to the transport controller 452 shown in FIG. 20. The transport control program 530 implements a function of the transport device 460 that transports the print medium.

The printing control program 532 is applied to the printing controller 454. The printing control program 532 implements various functions of the printing device 406. The drying control program 534 is applied to the drying controller 456. The drying control program 534 implements a function of the drying device 412 that dries the print medium in which the printing has been executed. The inspection control program 536 is applied to the inspection controller 458. The inspection control program 536 implements a function of the inspection device 410 that executes the inspection of the print image.

The memory 520 stores a density unevenness correction data update program 130. The density unevenness correction data update program 130 shown in FIG. 21 is the same as the density unevenness correction data update program 130 shown in FIG. 7. The memory 520 may store a density unevenness correction data update program 130A shown in FIG. 9.

In the embodiments of the present invention described above, the configuration elements can be changed, added, or deleted as appropriate without departing from the spirit of the present invention. The present invention is not limited to the embodiments described above, and various modifications can be made by those having ordinary knowledge in the field within the technical idea of the present invention.

EXPLANATION OF REFERENCES

- 100: density unevenness correction data creation apparatus
- 100A: density unevenness correction data creation apparatus
- 102: processor
- 104: computer-readable medium
- 106: communication interface
- 108: input/output interface
- 110: bus
- 112: memory
- 112A: memory
- 114: storage
- 120: input device
- 122: display device
- 130: density unevenness correction data update program
- 131: detection improvement processing program
- 132: alignment mark portion detection program
- 134: line mark portion center estimation program
- 136: density data estimation program
- 138: density unevenness correction data creation program
- 150: density unevenness correction data
- 180: printing device
- 190: image sensor system
- 200: density unevenness correction data acquisition unit
- 202: print data creation unit
- 204: scan image creation unit
- 205: detection improvement processing unit
- 206: alignment mark portion detection unit
- 208: line mark portion center estimation unit

210: density data estimation unit
212: density unevenness correction data creation unit
214: density unevenness correction data storage unit
300: correspondence relationship data
302: density unevenness correction data
400: ink jet printing system
402: print medium supply device
404: first intermediate transport device
406: printing device
408: second intermediate transport device
410: inspection device
412: drying device
414: accumulation device
420: ink jet head
420C: ink jet head
420K: ink jet head
420M: ink jet head
420Y: ink jet head
422: printing drum
424: in-line sensor
430: head module
430A: nozzle surface
432: head frame
434: dummy plate
436: flexible substrate
440: nozzle disposition portion
442: nozzle
444: nozzle opening
450: control device
451: system controller
452: transport controller
454: printing controller
456: drying controller
458: inspection controller
460: transport device
470: memory
472: sensor
502: processor
504: computer-readable medium
506: communication interface
508: input/output interface
510: bus
512: input device
514: display device
520: memory
522: storage
530: transport control program
532: printing control program
534: drying control program
536: inspection control program
1000: line mark adjustment screen
1002: line mark display region
1004: scale
1010: center density setting portion
1012: peripheral density setting portion
1014: center density input portion
1016: peripheral density input portion
1020: aspect ratio setting portion
1021: aspect ratio input portion
1022: center width setting portion
1023: center width input portion
1024: peripheral width setting portion
1025: peripheral width input portion
1026: line mark number setting portion
1027: line mark number input portion
1028: interval setting portion
1029: interval input portion
1030: setting button
1032: cancel button
AM: alignment mark
CP: density pattern
IS: image sensor
LM: line mark
LMC: center line portion
LMP: peripheral line portion
LP: line pattern
NCP: defective nozzle detection pattern
NP: non-pattern portion
S20 to S26: each step of density unevenness correction data update processing
S40 to S42: each step of density unevenness correction data creation sequence
S100 to S102: each step of density unevenness correction data creation method in case in which plurality of modes are provided

What is claimed is:

1. A density unevenness correction data creation method of creating density unevenness correction data applied to printing of a single-pass method in which a line head in which a plurality of recording elements are disposed along a first direction is used, the density unevenness correction data creation method comprising:

a test chart captured image acquisition step of acquiring a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium;

a correspondence relationship information acquisition step of acquiring correspondence relationship information representing a correspondence relationship between a theoretical position in the first test chart and an imaging position in the test chart captured image for the first direction and the second direction; and a density unevenness correction data creation step of creating the density unevenness correction data by using information on a density of the density step pattern in the test chart captured image, wherein, in the correspondence relationship information acquisition step, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in the density unevenness correction data creation step, the density unevenness correction data is created by estimating the density value of each position of the density step pattern in the first direction by using the detailed correspondence relationship in the first direction.

2. The density unevenness correction data creation method according to claim 1, wherein the density unevenness correction data creation step includes an alignment mark detection step of detecting the plurality of alignment marks from the test chart captured image, and the alignment mark detection step includes a detection improvement processing step of executing, with respect to the test chart captured image, detection improvement processing of improving a probability that the alignment mark is detected.

3. The density unevenness correction data creation method according to claim 2, wherein, in the correspondence relationship information acquisition step, the detailed correspondence relationship in the first direction is acquired for the test chart captured image that is not subjected to the detection improvement processing.

4. The density unevenness correction data creation method according to claim 2, wherein, in the detection improvement processing step, a brightness contrast enhancement amount with respect to the test chart captured image is decided from brightness information of the alignment mark that is not subjected to the detection improvement processing, and contrast enhancement processing is executed with respect to the test chart captured image by using the decided brightness contrast enhancement amount.

5. The density unevenness correction data creation method according to claim 2, wherein, in the detection improvement processing step, at least any one of blur filter processing, median filter processing, or morphology processing is applied to the test chart captured image.

6. The density unevenness correction data creation method according to claim 1, wherein the plurality of line marks have the same shape.

7. The density unevenness correction data creation method according to claim 1, wherein, in the correspondence relationship information acquisition step, the correspondence relationship in the second direction is acquired based on information on positions of the plurality of alignment marks in the second direction.

8. The density unevenness correction data creation method according to claim 1, wherein the correspondence relationship information acquisition step includes a line mark position estimation step of estimating the position of the line mark in the first direction by applying image processing with respect to the line mark in the test chart captured image in a case of creating the detailed correspondence relationship in the first direction.

9. The density unevenness correction data creation method according to claim 8, wherein, in the line mark position estimation step, for the estimated positions of the plurality of line marks, the line mark in which a difference of the position of each line mark estimated by using the detailed correspondence relationship with respect to the position of each line mark estimated by using the rough correspondence relationship exceeds a prescribed range is excluded from the line mark used for acquisition of the detailed correspondence relationship.

10. The density unevenness correction data creation method according to claim 1, wherein, in the density unevenness correction data creation step, at least one point of the theoretical position of each recording element is obtained from the test chart captured image for each density pattern included in the density step pattern by using the correspondence relationship, the test chart captured image is subjected to averaging processing or integration processing within a range of the density pattern for the second direction with respect to the theoretical position of each recording element obtained from the test chart captured image, and a density of each density pattern of each recording element is estimated.

11. The density unevenness correction data creation method according to claim 1, further comprising:

a mode switching step of selectively switching between a first mode in which the density unevenness correction data is created based on the test chart captured image of the first test chart, and a second mode which is executed separately from the first mode and in which the density unevenness correction data is created based on a second test chart in which a line pattern extending in the second direction is superimposed on the density step pattern included in the first test chart, wherein, in the second mode, a position of the line pattern in the first direction is estimated for a test chart captured image of the second test chart, the detailed correspondence relationship in the first direction is acquired by using information on the estimated position of the line pattern in the first direction, and the density unevenness correction data is created by estimating the density value of each position of the density step pattern in the first direction by using the detailed correspondence relationship in the first direction.

12. The density unevenness correction data creation method according to claim 11, wherein, in the second mode, common information common to a first sequence for generating the density unevenness correction data applied to the first mode and a second sequence for generating the density unevenness correction data applied to the second mode is used to correct a deviation of the correspondence relationship between the first sequence and the second sequence.

13. The density unevenness correction data creation method according to claim 12, wherein the common information includes information on an edge of the density pattern in the first direction.

14. The density unevenness correction data creation method according to claim 12, wherein the common information includes the information on the positions of the plurality of line marks in the first direction.

15. The density unevenness correction data creation method according to claim 12, further comprising:

an overlap region correction step of, in a case in which the test chart captured image is generated by using a plurality of image sensors, correcting the deviation of the correspondence relationship between the first sequence and the second sequence by using information on the line mark included in an overlap region in which imaging regions of the image sensors overlap for the first direction.

16. The density unevenness correction data creation method according to claim 15, wherein, in the overlap region correction step, the deviation of the correspondence relationship between the first sequence and the second sequence is corrected by using information in which positions of a plurality of the line marks disposed in the overlap region are subjected to statistical processing.

17. A density unevenness correction data creation apparatus that creates density unevenness correction data applied to printing of a single-pass method in which a line head in which a plurality of recording elements are disposed along a first direction is used, the density unevenness correction data creation apparatus comprising:

one or more processors; and one or more memories that store a program executed by the one or more processors, wherein the one or more processors execute a command of the program to acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, acquire correspondence relationship information representing a correspondence relationship between a theoretical position in the first test chart and an imaging position in the test chart captured image for the first direction and the second direction, and create the density unevenness correction data by using information on a density of the density step pattern in the test chart captured image, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating the density unevenness correction data, the density unevenness correction data is created by estimating the density value of each position of the density step pattern in the first direction by using the detailed correspondence relationship in the first direction.

18. A printing system comprising:

a line head in which a plurality of recording elements are disposed along a first direction; and a density unevenness correction data creation apparatus that creates density unevenness correction data applied to printing of a single-pass method in which the line head is used, wherein the density unevenness correction data creation apparatus includes one or more processors, and one or more memories that store a program executed by the one or more processors, the one or more processors execute a command of the program to acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium, acquire correspondence relationship information representing a correspondence relationship between a theoretical position in the first test chart and an imaging position in the test chart captured image for the first direction and the second direction, and create the density unevenness correction data by using information on a density of the density step pattern in the test chart captured image, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating the density unevenness correction data, the density unevenness correction data is created by estimating the density value of each position of the density step pattern in the first direction by using the detailed correspondence relationship in the first direction.

19. A non-transitory, computer-readable tangible recording medium which records thereon a program of creating density unevenness correction data applied to printing of a single-pass method in which a line head in which a plurality of recording elements are disposed along a first direction is used, the program causing a computer to:

acquire a test chart captured image obtained by imaging a first test chart that includes a density step pattern including one or more density patterns corresponding to one or more density values, a plurality of alignment marks having different shapes from each other, and a plurality of line marks having shapes extending in a second direction orthogonal to the first direction, and that is printed on a print medium;

acquire correspondence relationship information representing a correspondence relationship between a theoretical position in the first test chart and an imaging position in the test chart captured image for the first direction and the second direction; and create the density unevenness correction data by using information on a density of the density step pattern in the test chart captured image, wherein, in a case of acquiring the correspondence relationship information, a rough correspondence relationship representing the correspondence relationship between the theoretical position and the imaging position in the first direction is acquired by using information on a position of each alignment mark in the first direction specified based on the shape of each alignment mark, and a detailed correspondence relationship between the theoretical position and the imaging position in the first direction, which represents a more detailed correspondence relationship than the rough correspondence relationship, is acquired by using information on a position of each of the plurality of line marks estimated by using the acquired rough correspondence relationship, and in a case of creating density unevenness correction data, the density unevenness correction data is created by estimating the density value of each position of the density step pattern in the first direction by using the detailed correspondence relationship in the first direction.

* * * * *